US012801239B2

(12) United States Patent
Chan et al.

(10) Patent No.: US 12,801,239 B2
(45) Date of Patent: Nov. 17, 2026

(54) MERGED FLOATING PIXELS IN A TOUCH SCREEN

(71) Applicant: Apple Inc., Cupertino, CA (US)

(72) Inventors: Isaac Chan, San Jose, CA (US); Prathit Bugnait, Hayward, CA (US); Albert Lin, Cupertino, CA (US); Chun-Hao Tung, San Jose, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/389,672

(22) Filed: Dec. 19, 2023

(65) Prior Publication Data

US 2024/0134479 A1 Apr. 25, 2024

Related U.S. Application Data

(63) Continuation of application No. 16/510,410, filed on Jul. 12, 2019, now Pat. No. 11,893,183, which is a continuation of application No. 14/871,281, filed on Sep. 30, 2015, now Pat. No. 10,353,516.

(60) Provisional application No. 62/152,787, filed on Apr. 24, 2015.

(51) Int. Cl.

| | |
|---|---|
| ***G06F 3/041*** | (2006.01) |
| ***G06F 3/0354*** | (2013.01) |
| ***G06F 3/044*** | (2006.01) |
| ***G09G 3/36*** | (2006.01) |

(52) U.S. Cl.

CPC ........ *G06F 3/0418* (2013.01); *G06F 3/03545* (2013.01); *G06F 3/044* (2013.01); *G09G 3/3659* (2013.01); *G06F 2203/04804* (2013.01); *G09G 2300/0809* (2013.01)

(58) Field of Classification Search

None

See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |

(Continued)

FOREIGN PATENT DOCUMENTS

| | | | |
|---|---|---|---|
| CN | 101882039 | A | 11/2010 |
| CN | 102707522 | A | 10/2012 |

(Continued)

OTHER PUBLICATIONS

Advisory Action received for U.S. Appl. No. 16/510,410, mailed on Feb. 17, 2023, 3 pages.

(Continued)

*Primary Examiner* — Kirk W Hermann

(74) *Attorney, Agent, or Firm* — Kubota & Basol LLP

(57) ABSTRACT

In some examples, diffusing elements formed of floating segments of conductive materials can diffuse signal from a stylus to a plurality of electrodes, thus, making the signal profiles associated with the electrodes more linear. In addition, diffusing elements can be configured to improve the optical uniformity of the touch sensor panel. In some examples, the diffusing elements can be formed on the same layer as floating dummy pixels and resemble a plurality of merged floating dummy pixels.

17 Claims, 16 Drawing Sheets

(56) References Cited

U.S. PATENT DOCUMENTS

| | | | |
|---|---|---|---|
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,495,050 B1* | 11/2016 | Hoshtanar | G06F 3/0445 |
| 10,353,516 B2 | 7/2019 | Chan et al. | |
| 2006/0049834 A1 | 3/2006 | Umeda | |
| 2006/0097991 A1* | 5/2006 | Hotelling | G06F 3/04164 345/173 |
| 2006/0197753 A1 | 9/2006 | Hotelling | |
| 2008/0309633 A1 | 12/2008 | Hotelling et al. | |
| 2009/0021267 A1 | 1/2009 | Golovchenko et al. | |
| 2009/0250268 A1 | 10/2009 | Staton et al. | |
| 2009/0256821 A1 | 10/2009 | Mamba et al. | |
| 2010/0045615 A1 | 2/2010 | Gray et al. | |
| 2010/0108409 A1* | 5/2010 | Tanaka | G06F 3/0412 345/174 |
| 2010/0225612 A1 | 9/2010 | Ishizaki et al. | |
| 2010/0328268 A1 | 12/2010 | Teranishi et al. | |
| 2011/0050585 A1 | 3/2011 | Hotelling et al. | |
| 2011/0069036 A1 | 3/2011 | Anno | |
| 2011/0175671 A1* | 7/2011 | Reynolds | H03K 17/962 200/600 |
| 2011/0248953 A1 | 10/2011 | Lee et al. | |
| 2011/0298745 A1 | 12/2011 | Souchkov | |
| 2012/0075201 A1* | 3/2012 | Golovchenko | G06F 3/0445 345/173 |
| 2012/0098782 A1* | 4/2012 | Nam | G06F 3/0446 345/174 |
| 2012/0113047 A1* | 5/2012 | Hanauer | G06F 3/0446 345/174 |
| 2012/0169401 A1 | 7/2012 | Hristov et al. | |
| 2012/0249436 A1 | 10/2012 | Choi et al. | |
| 2012/0306797 A1 | 12/2012 | Misaki | |
| 2013/0155000 A1 | 6/2013 | Trend et al. | |
| 2013/0234985 A1 | 9/2013 | Huang | |
| 2013/0314109 A1 | 11/2013 | Kremin et al. | |
| 2013/0341651 A1 | 12/2013 | Kim et al. | |
| 2014/0055412 A1* | 2/2014 | Teramoto | G02F 1/133707 345/174 |
| 2014/0071171 A1 | 3/2014 | Mcgowan et al. | |
| 2014/0085246 A1* | 3/2014 | Shahparnia | G06F 3/0443 345/174 |
| 2014/0152921 A1 | 6/2014 | Yashiro et al. | |
| 2014/0198268 A1 | 7/2014 | Sugita et al. | |
| 2014/0210764 A1 | 7/2014 | Shepelev | |
| 2014/0225850 A1* | 8/2014 | Hristov | G06F 3/0446 345/173 |
| 2014/0313434 A1 | 10/2014 | Kim et al. | |
| 2014/0320757 A1* | 10/2014 | Hoshtanar | G06F 3/0446 349/12 |
| 2014/0320763 A1 | 10/2014 | Lee et al. | |
| 2014/0332361 A1 | 11/2014 | Huang et al. | |
| 2015/0062457 A1 | 3/2015 | Kida et al. | |
| 2015/0160754 A1 | 6/2015 | Wenzel | |
| 2015/0185202 A1 | 7/2015 | Perfettini et al. | |
| 2015/0220200 A1 | 8/2015 | Kim | |
| 2016/0018929 A1 | 1/2016 | Kida et al. | |
| 2016/0018935 A1 | 1/2016 | Wei et al. | |
| 2016/0259444 A1 | 9/2016 | Yang et al. | |
| 2016/0283003 A1 | 9/2016 | Liu | |
| 2016/0313858 A1 | 10/2016 | Chan et al. | |
| 2017/0017333 A1 | 1/2017 | Wang et al. | |
| 2019/0339813 A1 | 11/2019 | Chan et al. | |

FOREIGN PATENT DOCUMENTS

| | | |
|---|---|---|
| CN | 102725720 A | 10/2012 |
| CN | 202904521 U | 4/2013 |
| CN | 103713792 A | 4/2014 |
| CN | 104615324 A | 5/2015 |
| CN | 104635992 A | 5/2015 |
| EP | 2096526 A2 | 9/2009 |
| EP | 2096526 A3 | 12/2009 |
| EP | 2703876 A1 | 3/2014 |
| JP | 2000-163031 A | 6/2000 |
| JP | 2002-342033 A | 11/2002 |
| JP | 2005-156291 A | 6/2005 |
| KR | 10-2011-0122727 A | 11/2011 |
| KR | 10-2012-0109191 A | 10/2012 |
| KR | 10-2014-0104197 A | 8/2014 |
| WO | 2010/088670 A1 | 8/2010 |

OTHER PUBLICATIONS

Applicant Initiated Interview Summary received for U.S. Appl. No. 16/510,410, mailed on Oct. 19, 2020, 4 pages.

Extended European Search Report received for European Patent Application No. 16165003.1, mailed on Sep. 5, 2016, 11 pages.

Extended European Search Report received for European Patent Application No. 20206603.1, mailed on Jan. 22, 2021, 11 pages.

Final Office Action received for U.S. Appl. No. 14/871,281, mailed on Jan. 3, 2018, 52 pages.

Final Office Action received for U.S. Appl. No. 16/510,410, mailed on Feb. 9, 2021, 52 pages.

Final Office Action received for U.S. Appl. No. 16/510,410, mailed on Nov. 30, 2021, 25 pages.

Final Office Action received for U.S. Appl. No. 16/510,410, mailed on Sep. 22, 2022, 20 pages.

Non-Final Office Action received for U.S. Appl. No. 14/871,281, mailed on Apr. 20, 2017, 32 pages.

Non-Final Office Action received for U.S. Appl. No. 14/871,281, mailed on Jul. 25, 2018, 54 pages.

Non-Final Office Action received for U.S. Appl. No. 16/510,410, mailed on Apr. 20, 2022, 30 pages.

Non-Final Office Action received for U.S. Appl. No. 16/510,410, mailed on Jun. 25, 2020, 31 pages.

Non-Final Office Action received for U.S. Appl. No. 16/510,410, mailed on Jun. 29, 2021, 26 pages.

Non-Final Office Action received for U.S. Appl. No. 16/510,410, mailed on May 17, 2023, 36 pages.

Non-Final Office Action received for U.S. Appl. No. 16/510,410, mailed on Oct. 16, 2019, 37 pages.

Notice of Allowance received for U.S. Appl. No. 14/871,281, mailed on Mar. 5, 2019, 13 pages.

Notice of Allowance received for U.S. Appl. No. 16/510,410, mailed on Oct. 16, 2023, 14 pages.

Search Report received for Chinese Patent Application No. 202110039622.5, mailed on Feb. 3, 2024, 4 pages (2 pages of English Translation and 2 pages of Official Copy).

google.com, "Definition of Electrode", Available online at: <www.google.com>, [retrieved on Dec. 19, 017], 2 pages.

google.com, "Definition of Pitch", Available online at: <www.google.com>, [retrieved on Apr. 2, 2017], 4 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial

(56) References Cited

OTHER PUBLICATIONS

Fulfillment of the Requirements for the Degree of Doctor of Philosophy in Electrical Engineering, 1999, 363 pages.

* cited by examiner

MERGED FLOATING PIXELS IN A TOUCH SCREEN

CROSS-REFERENCE TO RELATED APPLICATION

This application is a continuation of U.S. patent application Ser. No. 16/510,410 (now published as U.S. Publication No. 2019-0339813), filed Jul. 12, 2019, which is a continuation of U.S. patent application Ser. No. 14/871,281 (now issued as U.S. Pat. No. 10,353,516), filed Sep. 30, 2015, which claims the benefit under 35 U.S.C. § 119(e) of U.S. Provisional Patent Application No. 62/152,787, filed Apr. 24, 2015, the contents of which are incorporated by reference herein in their entirety for all purposes.

FIELD OF THE DISCLOSURE

This relates generally to touch sensing, and more particularly, to improving position calculation for objects touching a touch sensor panel.

BACKGROUND OF THE DISCLOSURE

Touch sensitive devices have become popular as input devices to computing systems due to their ease and versatility of operation as well as their declining price. A touch sensitive device can include a touch sensor panel, or in some examples, a touch screen, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch screen using a finger, stylus, or other object at a location often dictated by a user interface (UI) being displayed by the display device. In general, the touch sensitive device can recognize a touch event and the position of the touch event on the touch screen, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styli have become popular input devices as they emulate the feel of traditional writing instruments. The effectiveness of a stylus, however, can depend on the ability to accurately calculate the position of the stylus on a touch sensor panel.

SUMMARY OF THE DISCLOSURE

A stylus can be used as an input device for some capacitive touch panels. In some examples, the touch sensor panel can have errors in position detection, referred to herein as wobble error, when a stylus is positioned between two of a plurality of sense electrodes. In some cases, wobble error can correlate to the signal profile between the stylus and electrodes within the touch sensor panel. Specifically, signal profiles which are narrower (i.e., less linear) can correlate to higher wobble error, while signal profiles which are widened within a range (i.e., to be more linear) can correlate to lower wobble error. Accordingly, in some examples, electrodes can be configured such that the signal profile associated with each electrode is spread to be wider, and thus, more linear.

In some examples, floating segments of conductive material can form diffusing elements configured to diffuse signals from a stylus to two or more electrodes, thus spreading the signal profile. In addition to improving signal profiles, some diffusing elements can improve the optical uniformity of the touch sensor panel by bridging visible areas between electrodes where no conductive material is formed. In some examples, diffusing electrodes can be formed on the same layer as dummy pixels and resemble a plurality of merged dummy pixels.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

A stylus can be used as an input device for some capacitive touch panels. In some examples, the touch sensor panel can have errors in position detection, referred to herein as wobble error, when a stylus is positioned between two of a plurality of sense electrodes. In some cases, wobble error can correlate to the signal profile between the stylus and electrodes within the touch sensor panel. Specifically, signal profiles which are narrower (i.e., less linear) can correlate to higher wobble error, while signal profiles which are widened within a range (i.e., to be more linear) can correlate to lower wobble error. Accordingly, in some examples, electrodes can be configured such that the signal profile associated with each electrode is spread to be wider, and thus, more linear. In some examples, floating segments of conductive material can form diffusing elements configured to diffuse signal from a stylus to two or more electrodes, thus spreading the signal profile. In addition to improving signal profiles, some diffusing elements can improve the optical uniformity of the touch sensor panel by bridging visible areas between electrodes where no conductive material is formed. In some examples, diffusing electrodes can be formed on the same layer as dummy pixels and resemble a plurality of merged dummy pixels.

Figure 1:
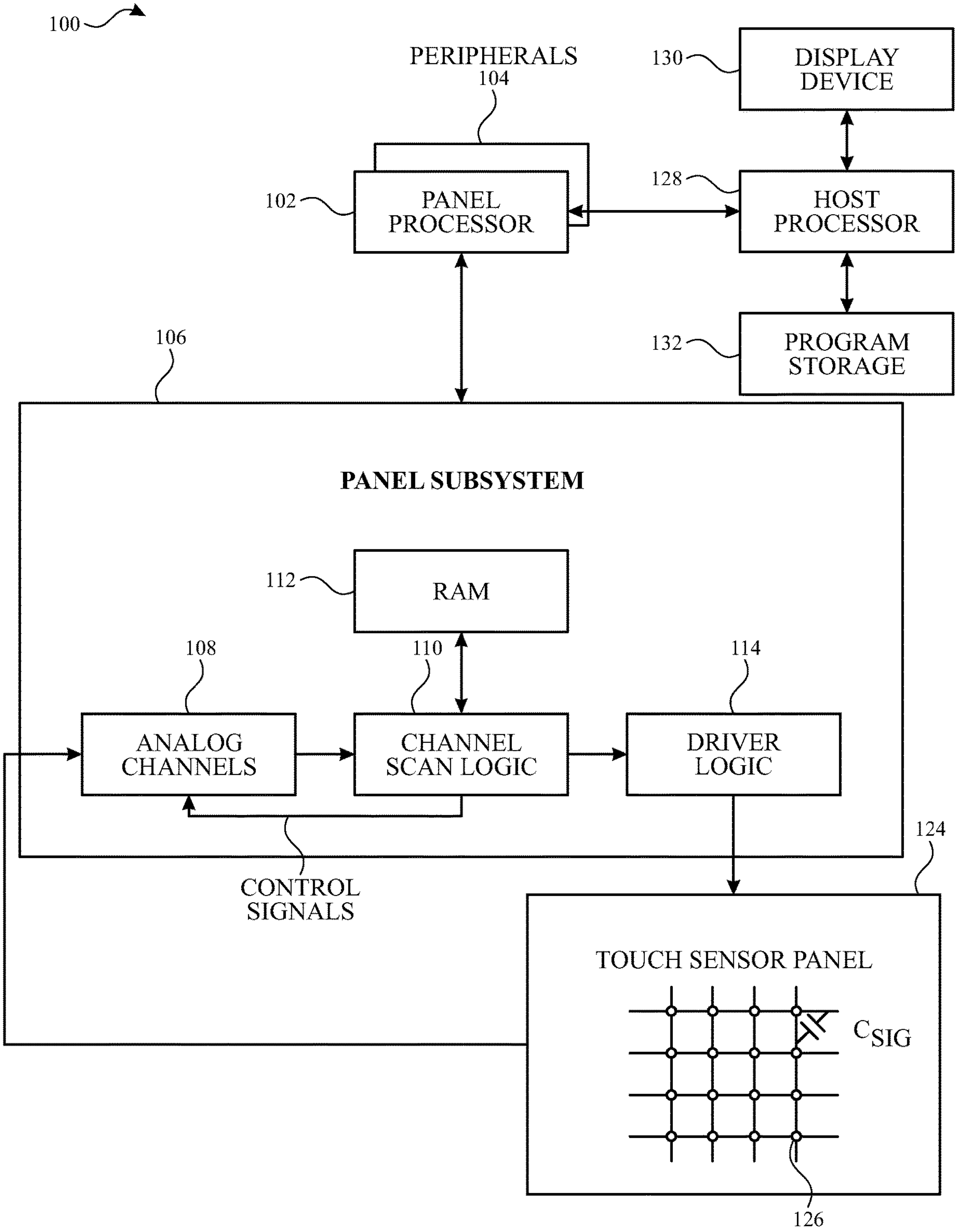
FIG. 1 illustrates an exemplary computing system capable of reducing wobble error and improving optical uniformity of a touch sensor panel according to examples of the disclosure.

FIG. 1 illustrates an exemplary computing system capable of reducing wobble error and improving optical uniformity of a touch sensor panel according to examples of the disclosure. Computing system 100 can include one or more panel processors 102, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. In mutual capacitance touch sensor panel examples, the panel can be driven and sensed using separate drive and sense lines, as shown in FIG. 1. However, in self capacitance touch sensor panel examples, the sense electrodes can be driven and sensed using the same lines. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to touch sensor panel 124. In some examples, panel subsystem 106, panel processor 102 and peripherals 104 can be integrated into a single application specific integrated circuit (ASIC).

In mutual capacitance sensing examples, touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel).) The capacitance between the drive and sense lines and local system ground can appear as a stray capacitance Cstray, and the capacitance at the intersections of the drive and sense lines, i.e., the touch nodes, can appear as a mutual signal capacitance Csig between the drive and sense lines when the given drive line is stimulated with an alternating current (AC) signal. The presence of a finger or other object (such as a stylus) near or on the touch sensor panel can be detected by measuring changes to a signal charge present at the nodes being touched, which can be a function of Csig. Each sense line of touch sensor panel 124 can be coupled to a sense channel 108 in panel subsystem 106. Touch sensor panel 124 can cover a portion or substantially all of a surface of a device.

In self capacitance sensing examples, touch sensor panel 124 can include a capacitive sensing medium having a plurality of sense electrodes. The sense electrodes can be formed from a transparent conductive medium such as ITO or ATO, although other transparent and non-transparent materials such as copper can also be used. The sense electrodes can be formed on a single side of a substantially transparent substrate, on opposite sides of the substrate, or on two separate substrates separated by dielectric material. In some examples, the sense electrodes can be pixelated and viewed as picture element (pixel) 126, which can be particularly useful when touch sensor panel 124 is viewed as capturing an "image" of touch. In other examples, the sense electrodes can be configured as elongated sense rows and/or sense columns. The capacitance between the sense electrodes and system ground can represent the self capacitance of those electrodes. The presence of a finger or other object (such as a stylus) near or on the touch sensor panel can be detected by measuring changes to the self capacitance of nearby sense electrodes. Each sense electrode of touch sensor panel 124 can be coupled to a sense channel 108 in panel subsystem 106. Touch sensor panel 124 can cover a portion or substantially all of a surface of a device.

In some examples, computing system 100 can also include a stylus as an input device. In some examples, the stylus can actively capacitively couple with the drive and/or sense lines of touch sensor panel 124 by, for example, transducing a signal from the stylus to the drive and/or sense lines. In some examples, the stylus can act as a passive input device in a mutual capacitance system, as described above. In some examples, the touch sensor panel 124 can include a conductive sensing media having a plurality of sense rows and a plurality of sense columns, or a plurality of sense electrodes. In these examples, a stylus can capacitively couple with the sense rows, sense columns, or sense electrodes.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form an integrated touch screen.

Note that one or more of the functions described above can be performed by firmware stored in memory (e.g., one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
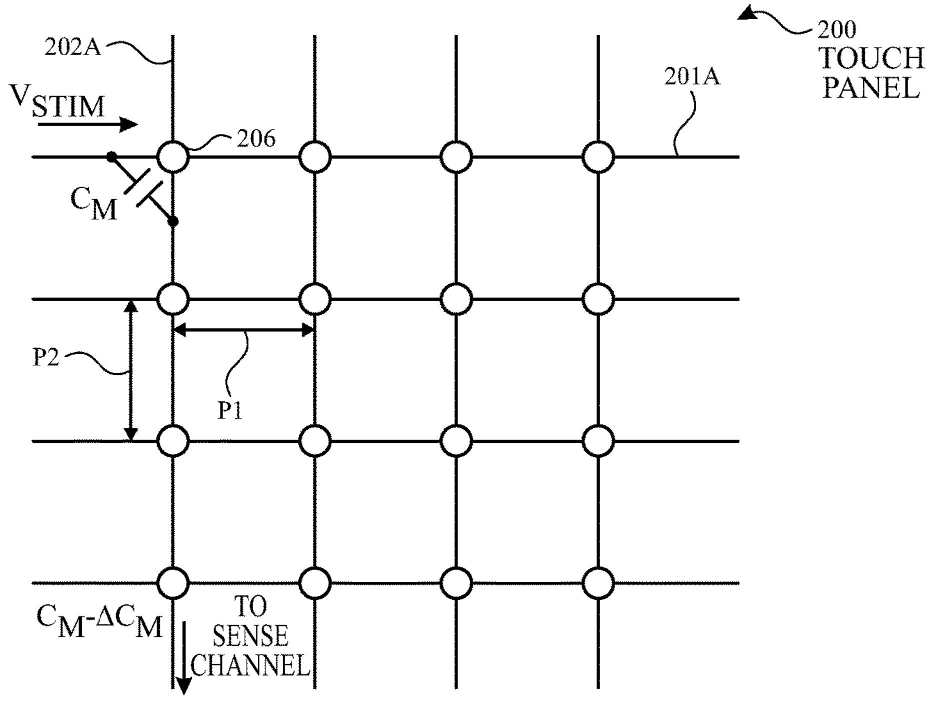
FIGS. 2A and 2B illustrate exemplary mutual capacitance touch sensor panels that can be used to detect touch or hover (proximity) events according to examples of the disclosure.

FIG. 2A symbolically illustrates an exemplary mutual capacitance touch sensor panel that can be used to detect touch or hover (proximity) events according to examples of the disclosure. In some mutual capacitance examples, touch sensor panel 200 can include an array of touch nodes 206 formed at the crossing points of row electrodes (e.g., drive lines) 201*a* and column electrodes (e.g., sense lines) 202*a*, although as discussed above, it should be understood that other drive and sense configurations can be used. A stylus can include an electrode configured to alter the capacitive coupling between a crossing row electrode and column electrode. Each of the column electrodes 202 can output its capacitance readings to one or more touch sensing circuits, which can be used to detect a touch or hover event.

The distance between each adjacent touch node in the same row can be a fixed distance, which can be referred to as the pitch P1 for column electrodes. The distance between each adjacent touch node in the same column can be a fixed distance, which can be referred to as the pitch P2 for row electrodes. In some examples, the pitch for row electrodes and column electrodes can be the same, but in other examples, P1 and P2 can be different.

During a mutual capacitance scan, one or more drive rows 201*a* can be stimulated to drive the touch sensor panel 200. Touch nodes 206 can have a mutual capacitance Cm at the touch nodes 206 when there is no object touching or hovering over touch nodes 206. When an object touches or hovers over the touch node 206 (e.g. a stylus), the mutual capacitance Cm can be reduced by ΔCm, i.e., (Cm−ΔCm), corresponding to the amount of charge shunted through the object to ground. This mutual capacitance change can used to detect a touch or hover event and its location.

Figure 2B:
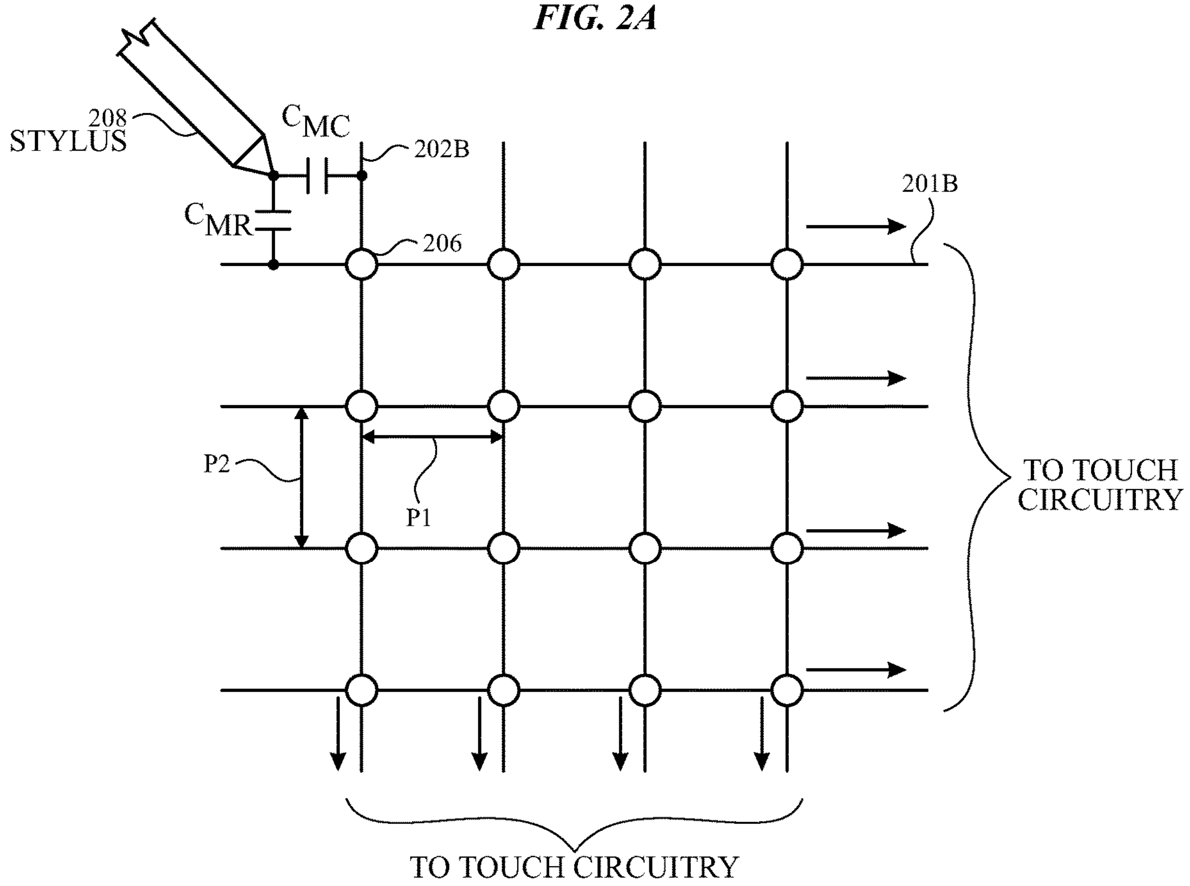

FIG. 2B symbolically illustrates an exemplary mutual capacitance touch sensor panel operable with an active stylus according to examples of the disclosure. In some mutual capacitance examples, an active stylus can generate stimulation signals (effectively operating as a drive electrode), and column electrodes 202*b* and row electrodes 201*b* can effectively operate as sense electrodes. During a stylus scan, one or more stimulation signals can be injected by stylus 208 into the touch sensor panel and can cause mutual capacitive coupling Cmr between the stylus 208 and the row traces 201*b* and capacitive coupling Cmc between the stylus 208 and the column traces 202*b*. The capacitance Cmr and Cmc can be transmitted to one or more touch sensing circuits for processing. In some examples, row traces 201*b* and column traces 202*b* can correspond to row electrodes 201*a* and sense columns 202*a*, however, during the stylus scan, stimulation signals are not applied to row electrodes 201 apart from signals generated by the active stylus. Additionally, in some examples, the touch sensor panel can include a stylus scan, a row scan, and a column scan, which can each operate as set forth above.

In some self capacitance examples, touch sensor panel 200 can include a plurality of sense electrodes (touch nodes). In some examples, the sense electrodes can be configured as elongated sense rows 201 and/or sense columns 202. In other examples each sense electrode can be electrically isolated from the other sense electrodes and configured to represent a particular X-Y location (e.g. touch node 206) on the panel. A stylus can include an electrode configured to capacitively couple to a sense electrode. Each of the sense electrodes can output its capacitance readings to one or more touch sensing circuits, which can be used to detect a touch or hover event.

In some cases, an object, such as a stylus, may touch or hover at a position not directly over a touch node 206, but in between two touch nodes 206. For example, a stylus may touch or hover at a position between two row electrodes 201, between two column electrodes 202, or both. In these examples, the signal sensed at a plurality of touch nodes 206 may be used to estimate the location of the touch or hover event. In some examples, a centroid estimation algorithm can calculate the location of the touch or hover event using the signal sensed at the plurality of touch nodes 206. For example, the position of a stylus on a touch sensor panel along an x-axis can be calculated by computing a weighted centroid defined in equation (1):

$$x_{calc} = \frac{\sum_{i=-N}^{N} x_i S_i}{\sum_{i=-N}^{N} S_i} \quad (1)$$

where can be the calculated position along the x-axis, $S_i$ can be the signal measured at the $i^{th}$ electrode, such as a sense electrode, along the x-axis, and $x_i$ can be the position of the $i^{th}$ electrode along the x-axis. It is to be understood that the centroid estimation algorithm defined in equation (1) is given only as an example, and the configurations described herein need not be limited to such examples. Instead, the calculation of a touch or hover location of an object can be accomplished using any appropriate method.

Ideally, as an object such as a stylus traverses between two touch nodes, the calculated position of the stylus on the touch screen and the actual position of the stylus should be the same. In reality, the calculated position may be different from the actual position due to limitations in the circuit configuration and the position estimation algorithms used. Errors resulting from the disparity between calculated position and actual position as an object moves along a touch sensor panel can be referred to as wobble error.

Figure 3A:
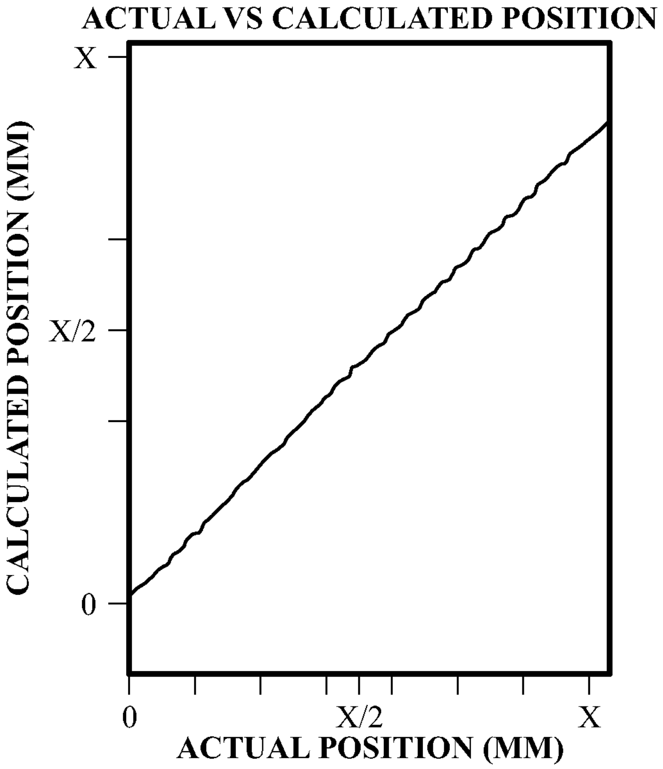
FIGS. 3A-3B illustrate examples of the disparity between actual position and calculated position as a stylus moves along one axis of a touch sensor panel according to examples of the disclosure.
Figure 3B:
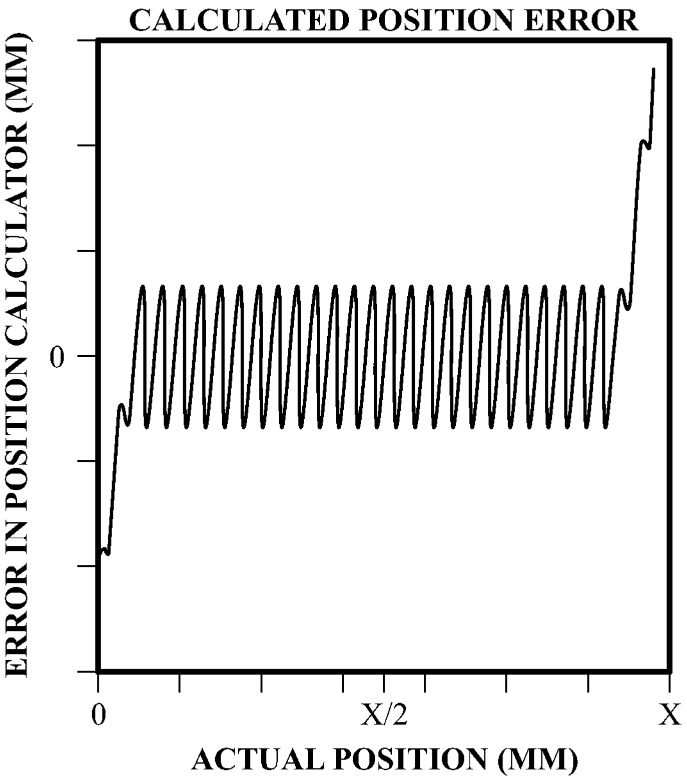

It can be useful to consider wobble error in the context of a stylus moving along a single axis of a touch sensor panel without diffusing elements. This concept is illustrated by example in FIGS. 3A and 3B. FIGS. 3A and 3B illustrate examples of the disparity between actual position and calculated position as an object, such as a stylus, moves along an x-axis of a customary touch sensor panel (e.g., a touch panel without diffusing elements) according to examples of the disclosure. FIG. 3A illustrates a plot of the calculated position of the stylus versus the actual position of the stylus when calculating position by using a weighted centroid algorithm including a subset of the electrodes (e.g., five electrodes) along an x-axis. In an ideal case, where calculated position and actual position are the same, the plot can be a straight line at a 45 degree angle. However, because of non-idealities in the coupling between the stylus and the touch sensor panel and the algorithm used to calculate stylus position, there can be non-ideal results that can appear as a wobble in the plot of FIG. 3A as the stylus moves between electrodes along the x-axis. In other words, the signal coupling between the stylus and touch sensor panel and the calculated position metric can introduce an error in calculated position (discrepancy with actual position) that can cause a wobble to be displayed when plotting the actual versus calculated position.

FIG. 3B illustrates a plot of the error in position calculation versus the actual position when calculating position by taking a weighted centroid including a subset of the electrodes (e.g., five electrodes) along an x-axis. The oscillation of the error plot can be representative of the wobble due to remaining error in the position calculation in a customary touch panel (e.g., a touch panel without diffusing elements).

It should be noted that the scope of this disclosure can extend beyond the context of an active stylus coupling to sense electrodes, however, the examples of this disclosure focus on a stylus-sense electrode configuration for ease of description. FIGS. 3A and 3B relate to calculating position using a subset of the electrodes, however, it should be understood that the position could be calculated using any number of electrodes, including all of the electrodes in a touch sensor panel. Moreover, although FIGS. 3A and 3B are described with reference to the x-axis, in some examples, similar effects can be observed when moving the stylus across the touch sensor panel along the y-axis.

Figure 4A:
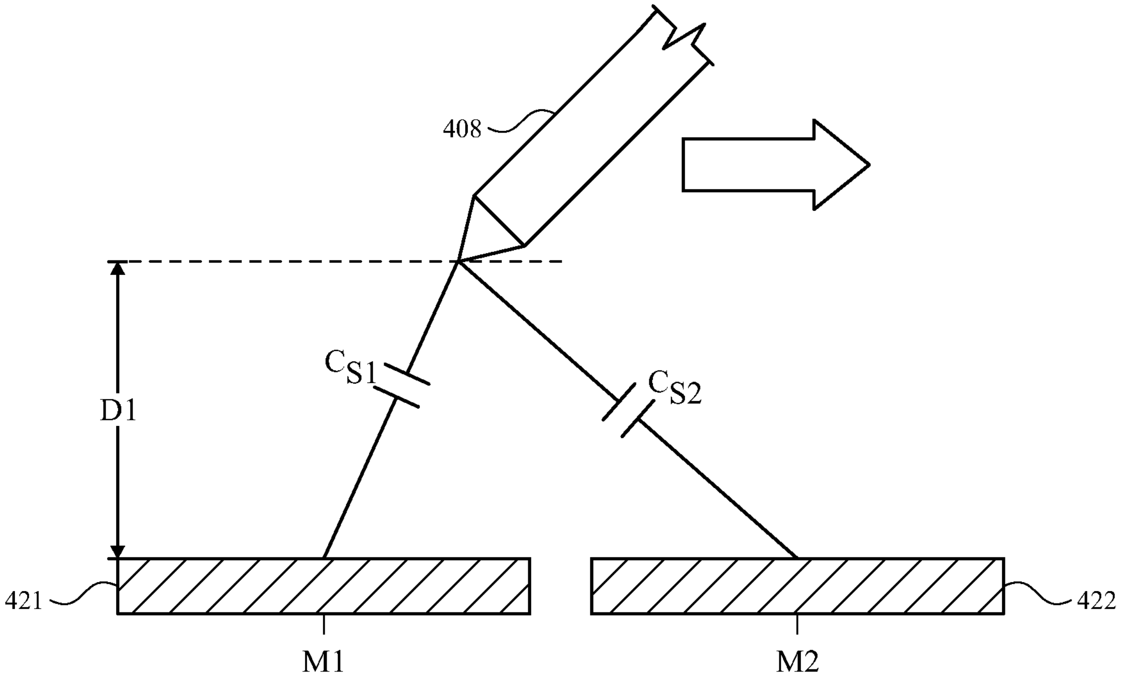
FIGS. 4A and 4B illustrate exemplary signal profiles for a stylus proximate to a touch sensor panel according to examples of the disclosure.
Figure 4B:
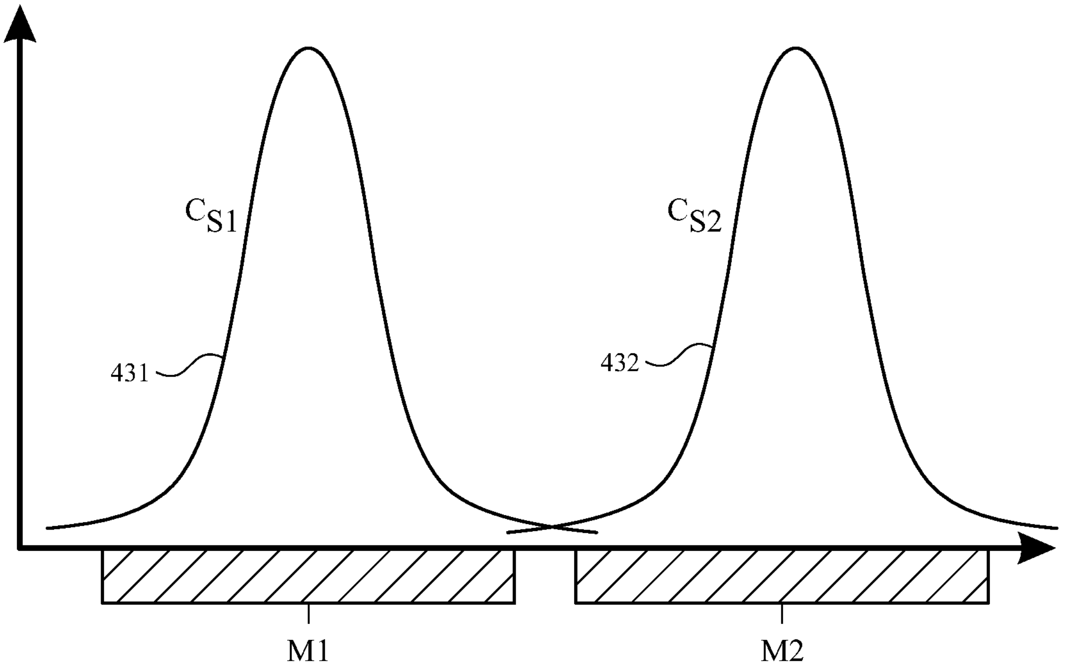

It can be useful for the purposes of this disclosure to discuss the concept of signal profiles. This concept is explained by example with reference to FIGS. 4A and 4B. FIGS. 4A and 4B relate to exemplary signal profiles in an x-axis corresponding to example electrodes 421 and 422 in a configuration not having a diffusing element. As shown in FIG. 4A, an object, such as a stylus 408, can be at a distance D1 above an electrode 421 and moved in an x-direction across electrodes 421 and 422. At each point along the x-axis, a signal coupling Cs exists between the stylus and the electrode, which varies as the stylus moves from the midpoint M of each electrode. FIG. 4B illustrates example signal profiles 431 and 432 correlating to the signals $Cs_1$ and $Cs_2$ measured on electrodes 421 and 422, respectively. The x-axis of the plot in FIG. 4B can correlate to the position of the stylus in the x-direction, and the y-axis of the plot can correlate to a normalized signal measurement at each x-position along the x-axis. For clarity, the positions of electrodes 421 and 422, including respective midpoints M1 and M2 along the x-axis are shown below the x-axis in FIG. 4B. As shown in FIGS. 4A and 4B, the signal profiles 431 and 432 can have a maximum at the midpoints M1 and M2 of the electrodes, and the signal profile can decrease as stylus 408 traverses along the x-axis away from the midpoints.

In some examples, the signal profile between a stylus and an electrode in a touch sensor panel without diffusing elements can be very non-linear. In some cases, this non-linearity can correlate with higher wobble error in the touch sensor panel. More specifically, position estimation algorithms (e.g., equation (1) above) can produce more errors in position estimation at regions between electrode midpoints (e.g., between M1 and M2) if the signal profile associated with each electrode drops sharply as a stylus moves away from these midpoints.

Because non-linearity in signal profiles can correlate with higher wobble error, it can be beneficial to spread the signal profiles as to be more linear. In some examples, the signal profiles between a stylus and electrodes in a touch sensor panel can be spread by adding segments of floating (i.e., electrically disconnected from voltage or ground) conductive material over the electrodes. In these examples, signal from a stylus can be diffused through the floating conductors and diffused to one or more of the electrodes. These floating conductors, hereinafter referred to as "diffusing elements," can be implemented in a multitude of configurations. The operation and exemplary configurations of diffusing elements will now be described.

Figure 5:
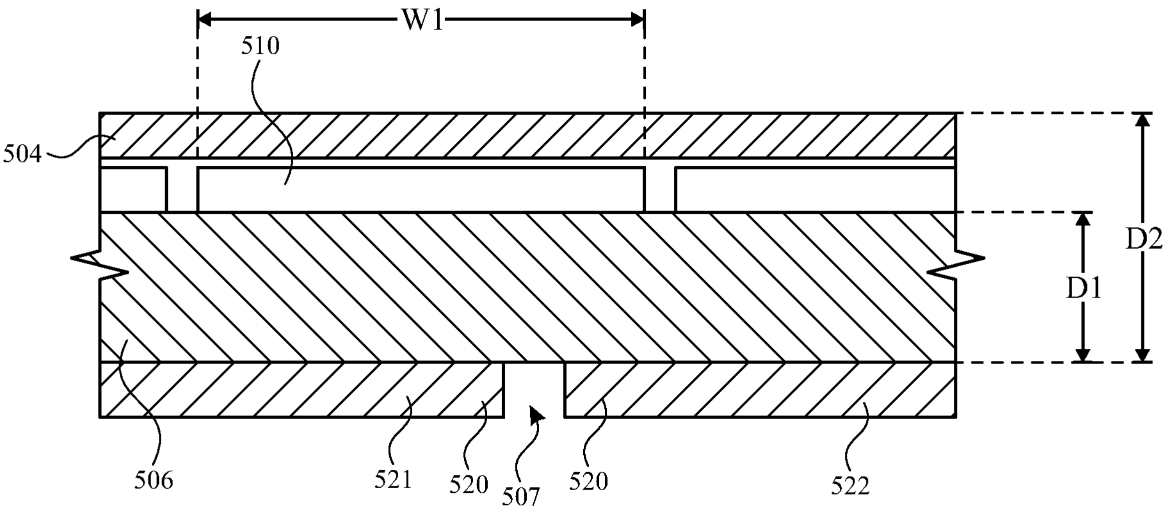
FIG. 5 illustrates an exemplary touch sensor panel having a diffusing element according to examples of the disclosure.

FIG. 5 illustrates a simplified side view of an exemplary touch sensor panel 500 including a diffusing element 510. As shown in FIG. 5, diffusing element 510 can be formed on a first side of a substrate 506 of a conductive material, and a plurality of electrically isolated electrodes 520 can be formed on a second side of substrate 506. The touch sensor panel shown in FIG. 5 can be a double-sided ITO (DITO) substrate 506 with ITO patterned on both sides; however, other examples may use a different touch sensor panel stackup configuration. Substrate 506 can be made of any transparent substrate material, such as plastic, glass, quartz, or a rigid or flexible composite. As shown, electrodes 520 can be electrically separated by a gap 507 in conductive material M2. In some examples, the touch sensor panel can further include a cover 504 (e.g., a glass cover in a touch screen configuration), which can be formed from glass, acrylic, sapphire, and the like. One or more diffusing elements can be formed such that a single diffusing element (e.g., diffusing element 510) can cover at least a portion of two separate electrodes (e.g., electrodes 521 and 522), including the gap 507 between the electrodes. For simplicity, other elements have been omitted in FIG. 5 that may be present in the touch sensor panel 500, for example, adhesive layers and elements for conductive routing. FIG. 5 is presented only as one example of a touch sensor panel with diffusing elements. Different touch sensor panel configurations with diffusing elements will be discussed in detail later in this disclosure; however, it should be noted here that the scope of the disclosure is not limited to the configuration illustrated in FIG. 5.

Figure 6A:
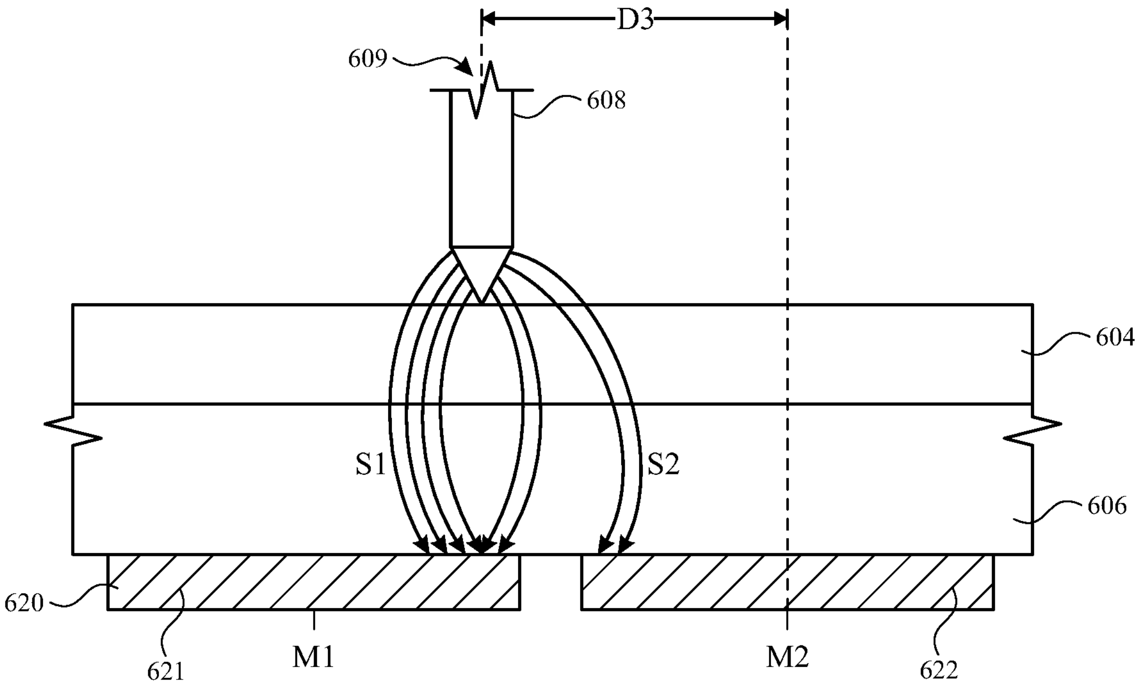
FIGS. 6A-6E illustrate a comparison of example signal distributions and signal profiles associated with electrodes in exemplary touch sensor panels according to examples of this disclosure.
Figure 6B:
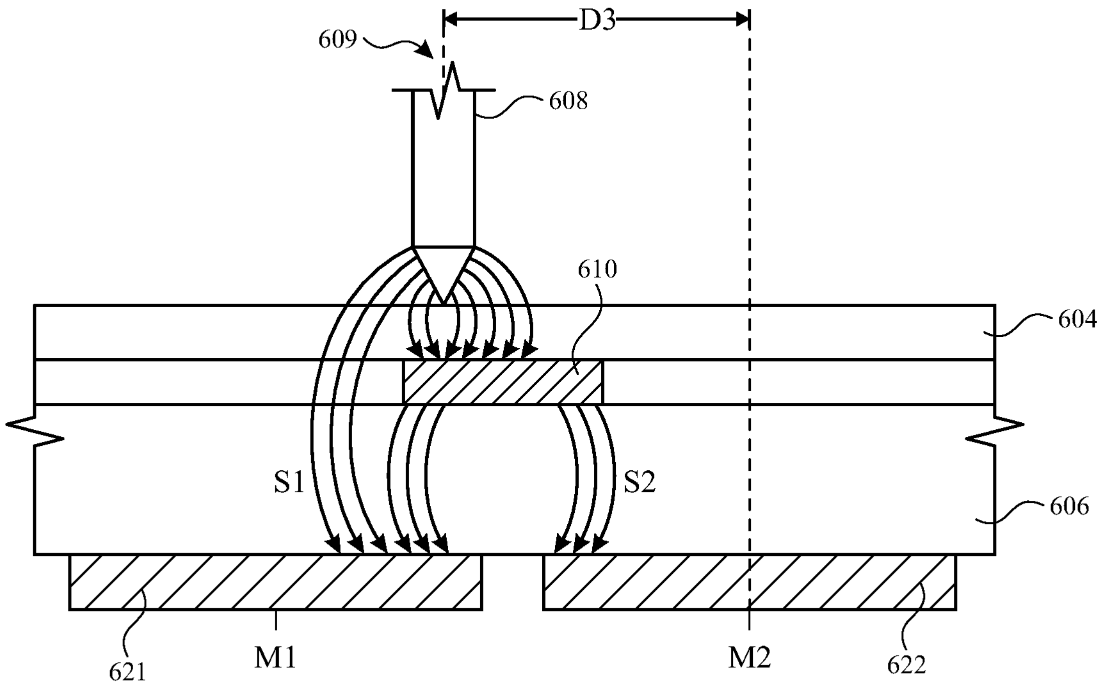

The operation of an example diffusing element will now be described with reference to FIGS. 6A-6E. FIGS. 6A-6D compare the distribution of signals from a stylus to electrodes 620 in two example touch sensor panel configurations according to examples of this disclosure. FIGS. 6A-6B correspond to a touch sensor panel without diffusing elements, and FIGS. 6C-6D correspond to a touch sensor panel with diffusing elements. FIG. 6E compares the signal distributions of FIGS. 6B and 6D in the context of signal profiles between the stylus and electrodes 620, as will be explained in more detail below. As will become apparent, diffusing elements 610 can diffuse signal S from a stylus 608, thus spreading the signal profile associated with electrodes 620.

FIG. 6A illustrates an exemplary touch sensor panel without a diffusing element. As shown, a stylus 608 can be separated from electrodes 620 by a substrate 606. In some examples, substrate 606 can be formed of a dielectric material. In some examples, the stylus can be further separated from electrodes 620 by a cover 604 (e.g., a glass cover in a touch screen configuration). The stylus 608 can be positioned at a point 609 over a central electrode 621 (i.e., the electrode most proximate to the stylus) and a distance D3 from the midpoint M2 of adjacent electrode 622, as shown. Stylus 608 can be capacitively coupled to one or more electrodes 620, thus distributing a capacitive signal S to one or more electrodes. Signal couplings S1 and S2 are conceptually represented in both FIGS. 6A and 6C as field lines extending from the stylus, where the number of field lines coupled to an electrode corresponds to the strength of the signal S received at that electrode. It should be noted that, although the field lines shown in FIG. 6A extend in a direction away from the stylus, in some examples, field lines may extend from the stylus, to the stylus, or both. In some examples, the signal S1 coupled to the central electrode 621 (the electrode most proximate to stylus 608) is much stronger than the signal S2 coupled to adjacent electrodes.

FIG. 6B illustrates an example signal distribution 630 for the touch sensor panel 600 in the configuration shown in FIG. 6A (e.g., a touch sensor panel having a diffusing element 610). Electrodes 620 in FIG. 6B can correspond to electrodes 620 in FIG. 6A. Each portion of signal S shown in FIG. 6B can corresponds to the amplitude of the signal S detected at each electrode 620. As shown, the signal S1 detected at central electrode 621 has the highest amplitude, and the amplitude S2 drops sharply at adjacent electrode 622.

Figure 6C:
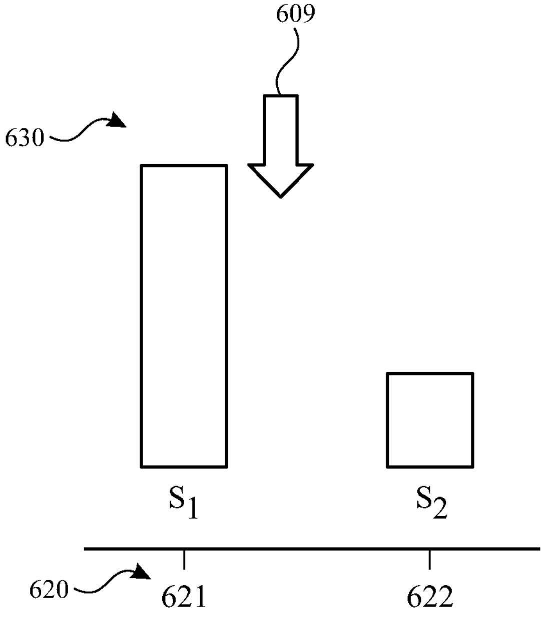

FIG. 6C illustrates an exemplary touch sensor panel 600 having a diffusing element 610. The attributes and position of electrodes 620 can be analogous to electrodes 620 described with reference to FIG. 6A. As shown, a diffusing element 610 can be formed from a floating segment of conductive material such that stylus 608 can be separated from electrodes 620 by the cover 604, diffusing element 610, and substrate 606. Like FIG. 6A, stylus 608 can be positioned at a point 609 over a central electrode 621 at a distance D3 from the midpoint M2 of adjacent electrode 622. However, unlike FIG. 6A, stylus 608 can also be capacitively coupled to diffusing element 610, which in turn is capacitively coupled to electrodes 621 and 622. In these configurations, electrodes can receive signal from stylus 608 through direct capacitive coupling with stylus 608 and/or through intermediate capacitive coupling with diffusing element 610.

Figure 6D:
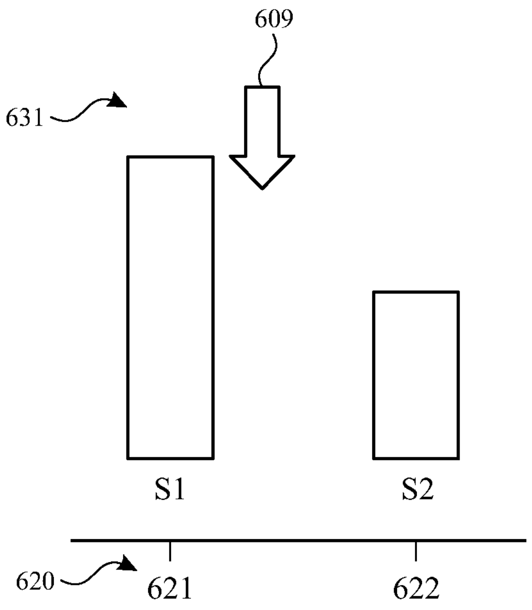
Figure 6E:
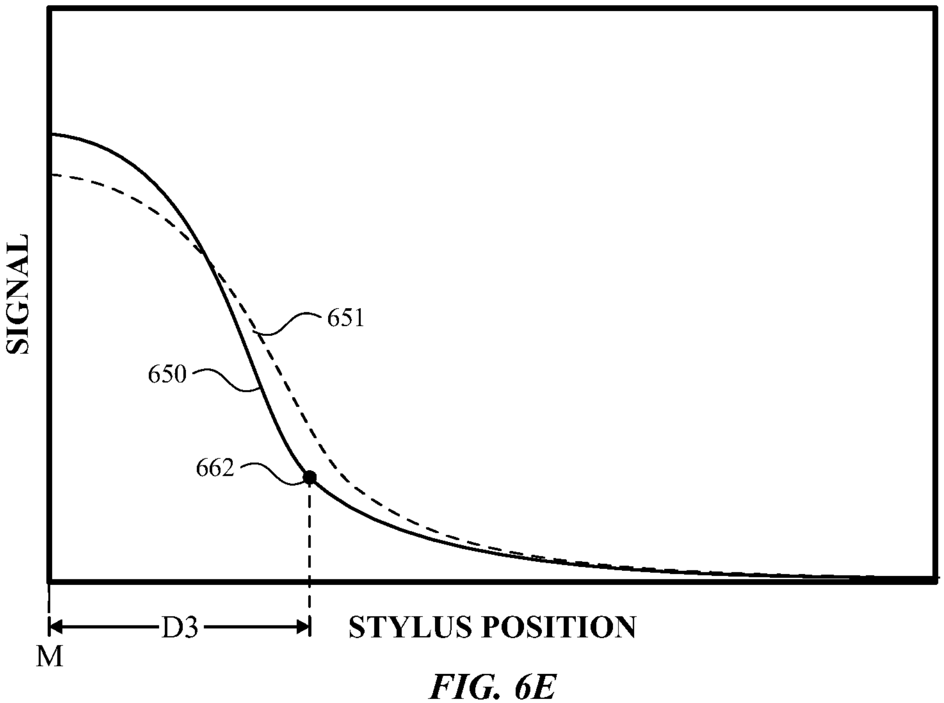

FIG. 6D illustrates an example signal distribution 631 for the touch sensor panel 600 in the configuration shown in FIG. 6C (e.g., a touch sensor panel having a diffusing element 610). Electrodes 620 in FIG. 6D can correspond to electrodes 620 in FIG. 6C. Each portion of signal S shown in FIG. 6D corresponds to the amplitude of the signal S detected at each electrode 620. Like in FIG. 6B, the signal S1 detected at central electrode 621 still has the highest amplitude. However, in contrast to FIG. 6B, when the signal is diffused through diffusing element 610, the amplitude drops less sharply for adjacent electrode 622. In other words, the signal distribution to each electrode is more linearly proportional to the distance each electrode is from the stylus 608.

It can be useful to consider the signal distributions 630 and 631 in the context of the signal profiles between a stylus and electrodes within each configuration. FIG. 6E compares an example signal profile 650 of an electrode in a non-signal-diffusing configuration to an example signal profile 651 of an electrode in a signal-diffusing configuration. For example, signal profiles 651 and 652 can correspond to the signal profiles associated with electrode 622 in the configurations of FIGS. 6A and 6C, respectively. Moreover, signal profiles 650 and 651 can correspond to signal distributions 630 and 631. For example, in FIG. 6E, point 662 on signal profile 651 at a distance D3 can correspond to the amplitude S2 shown in FIG. 6B when the stylus is a distance D3 from midpoint M2. As shown in FIG. 6E, electrodes bridged by a diffusing element 610 can have a wider, and thus more linear, signal profile. As discussed above, a more linear signal profile, within certain ranges, can correlate to a lower wobble error of the touch sensor panel. It should be understood that the scope of the disclosure is not limited to the mutual capacitance configurations shown in FIGS. 5, 6A, and 6C, but can include any configuration in which the signal profile is spread, including self capacitance configurations and mutual capacitance configurations wherein the stylus acts as a passive input device.

As discussed above, it can be beneficial in reducing wobble error to diffuse capacitive signal using one or more diffusing elements. Various configurations implementing one or more diffusing elements will now be described in detail with reference to FIGS. 7-9 according to examples of this disclosure.

FIGS. 7A-7D illustrate exemplary configurations of diffusing elements according to examples of this disclosure. In some examples, diffusing elements can be configured to cover specific touch nodes 706. In some examples, touch nodes 706 can be analogous to the touch nodes discussed with reference to FIGS. 2A-2B above, wherein each node 706 represents an intersection of a drive line 701 and a sense line 702. In other examples, touch nodes 706 may correspond to self-capacitance touch nodes. Accordingly, although this disclosure discusses diffusing elements in terms of diffusing signal to touch nodes, it is understood that each touch node may represent different combinations of one or more electrodes.

Figure 7A:
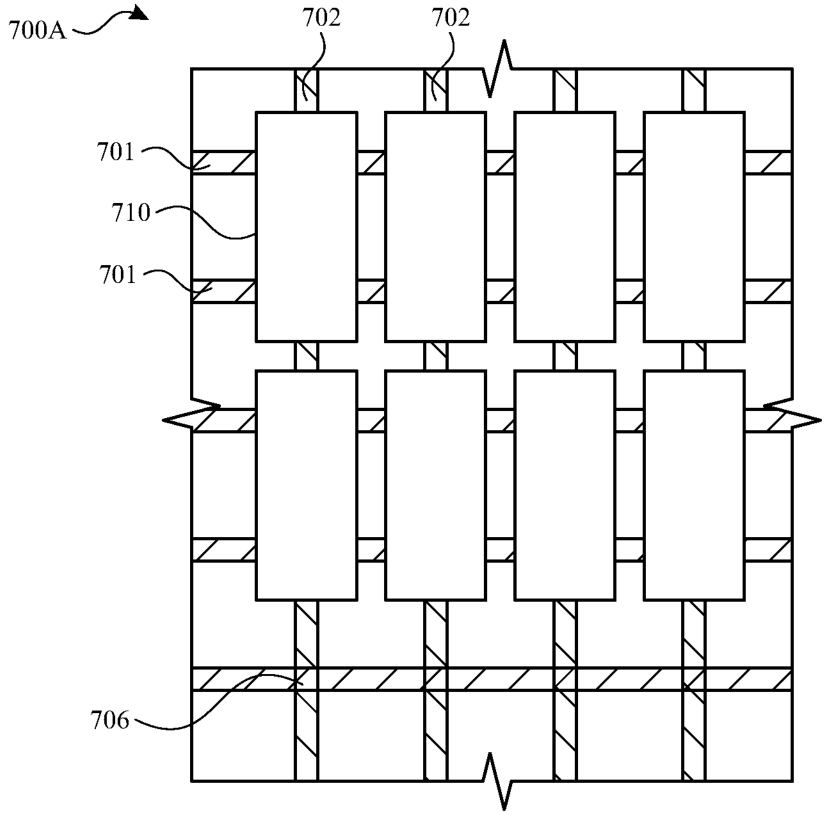
FIGS. 7A-7D illustrate exemplary configurations of diffusing elements according to examples of the disclosure.
Figure 7B:
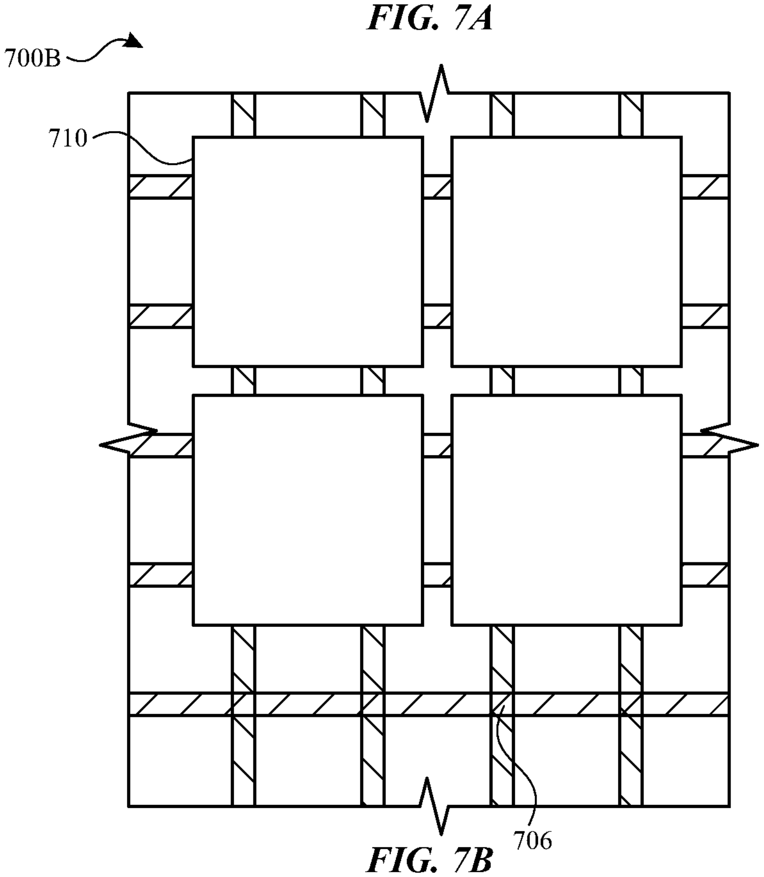
Figure 7C:
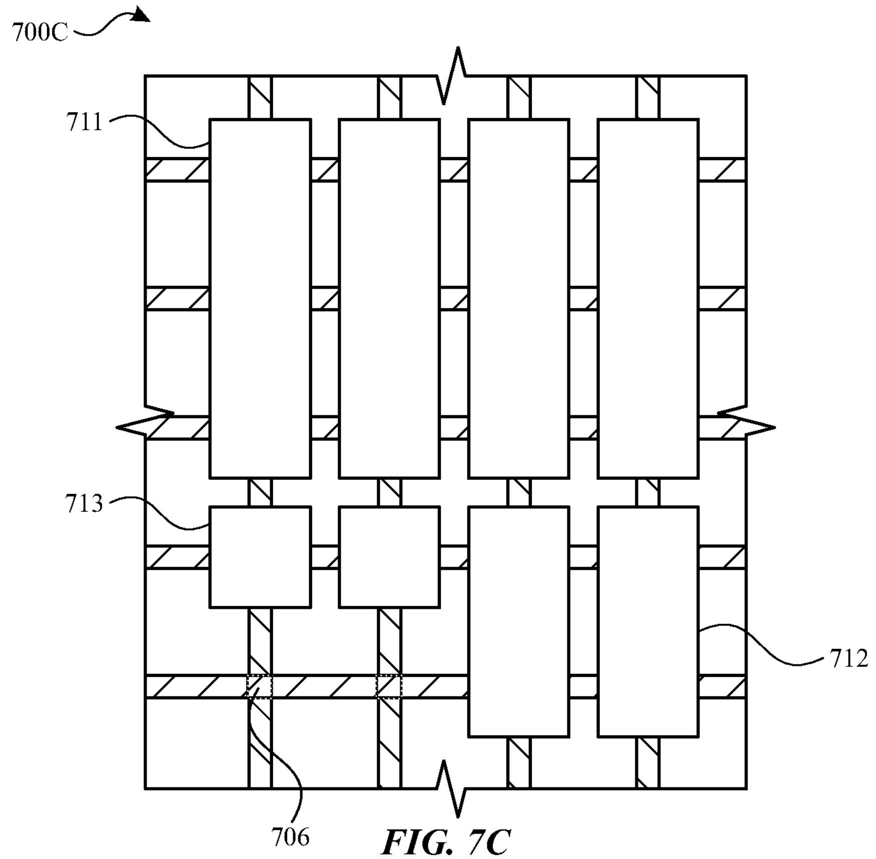

FIG. 7A shows a configuration 700*a*, wherein diffusing elements 710 can be configured to diffuse signal capacitance in a single dimension. For example, the diffusing elements 710 in configuration 700*a* may diffuse a signal across two drive electrodes (e.g., two drive lines 701), while not diffusing the signal across sense electrodes (e.g., two sense lines 702). FIG. 7B shows a configuration 700*b*, wherein diffusing elements 710 can be configured to diffuse signal capacitance in two dimensions. In some examples, it can be beneficial to restrict the diffusion of signal to a selected group of touch nodes 706. In the example of FIG. 7B, each diffusing element 710 is configured to cover four touch nodes arranged in a square, though other shapes are contemplated within the scope of this disclosure. In some examples, different diffusing elements can cover different numbers of touch nodes. FIG. 7C shows a configuration

Figure 7D:
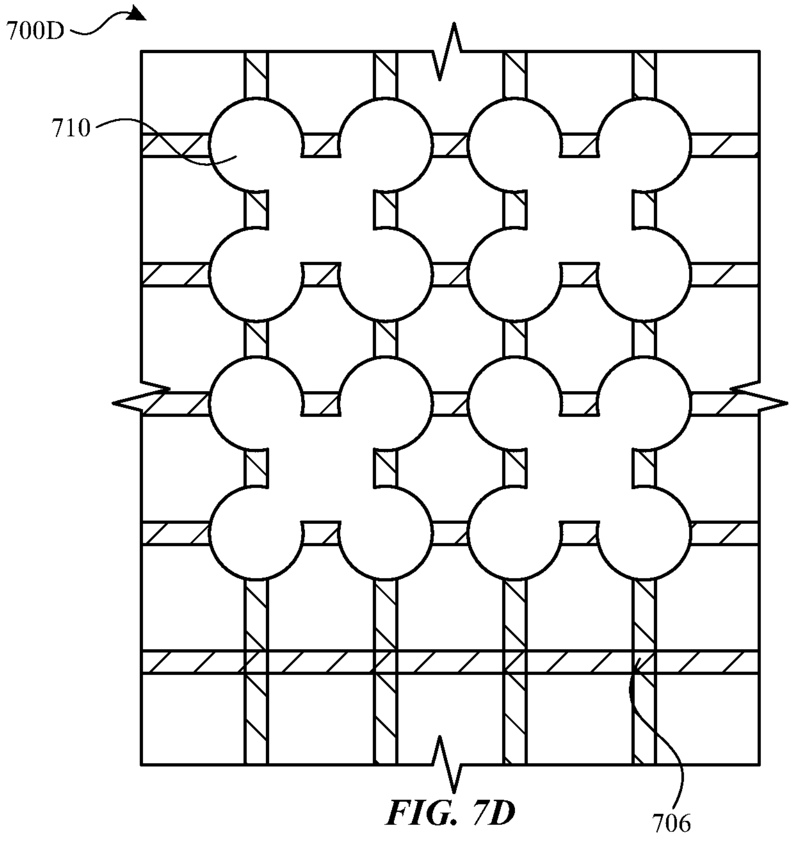

700*c*, wherein a first group of diffusing elements 711 can be configured to each diffuse signal capacitance in a first dimension to three touch nodes 706 A second group of diffusing elements 712 can be configured to each diffuse signal capacitance in a first dimension to only two touch nodes 706. A third group of floating conductive segments 713 can be configured as to only cover a single touch node. In some examples, floating conductors covering only a single touch node (e.g., not diffusing signal capacitance between electrodes) can be included as dummy pixels for optical purposes, as will be discussed in detail with reference to FIGS. 9-10 below. Moreover, as will be discussed in more detail below, in some configurations a floating conductive segment can form a diffusing element covering only a portion of a touch node, or in other words, the diffusing element may cover only a portion of the electrodes forming the touch node. In some examples, diffusing elements may be non-rectangular. FIG. 7D shows an example configuration 700*d*, wherein diffusing elements 710 can be configured to diffuse signal capacitance to touch nodes 706 in an X formation. In some examples, as shown in FIG. 7D, the shape of diffusing elements 710 can be rounded. FIGS. 7A-7D are presented only as examples of possible signal-diffusing configurations. It should be understood that this disclosure is not limited to any particular pattern or shape, but includes any shape that can be formed from floating conductive material.

In some examples, attributes of a touch sensor panel including a diffusing element can be selected such that a desired signal profile is achieved between the stylus and one or more electrodes. Referring back to FIG. 5, a diffusing element 510 can have a width W1. The diffusing element can separated from electrodes 520 by a distance D1. In some examples, as in FIG. 5, distance D1 can include the thickness of a substrate 506. Additionally, a stylus (not shown) above cover 504 can be separated from electrodes 520 by a distance D2. In some cases, the diffusing element width W1 and the distance between diffusing element and electrodes D1 can influence the signal profile shape, however, it should be noted that a variety of additional factors can also contribute to the signal profile shape; for example, the shape and pitch of electrodes, the conductivity of the materials, and the power of the signal itself.

As discussed above, electrodes associated with signal profiles that are more linear can correlate to less wobble error in a touch sensor panel. However, in some examples, increasing the linearity of signal profiles can simultaneously reduce the maximum signal capacitance detected at each electrode, thus, decreasing the signal-to-noise ratio (SNR) of the touch sensor panel. Therefore, in some examples, the width W1 of a diffusing element and/or the distance D1 between electrodes and diffusing element can be selected as to strike an acceptable balance between the linearity of the signal profiles and the maximum signal capacitance detected by the electrodes, where some designs may value one attribute over the other. In some examples, the optimal diffusion element width can be expressed as a function of the ratio between electrode pitch P and diffusion element width W, that is, W:P. For example, in the configuration shown in FIG. 5, the optimal ratio W1:P1 can be between 1:5 and 1:3. However, it should be understood that the optimal ratio may vary greatly depending on design goals and attributes of the touch sensor panel. For example, in configurations where a diffusing element is formed directly above an electrode layer (i.e., not separated from the electrodes by a substrate), the distance D1 between the diffusing element and the electrodes can be much smaller, and the ratio may be different to reflect this. Moreover, the selection of diffusing element attributes can be further influenced by other factors, such as efforts to maintain optical uniformity of the touch sensor panel, and the interaction of the diffusing elements with other circuit elements in the touch sensor panel. For example, in cases where diffusing elements are formed on the same layer as electrodes, the physical and electrical properties of electrodes can constrain the design of diffusion elements formed in the same layer. It should be noted that although diffusing element 510 is shown as being positioned symmetrically over electrodes 521 and 522 in FIG. 5, other configurations are contemplated in which diffusing elements are positioned asymmetrically, for example, to spread a signal profile in one direction or to compensate for irregularities in the touch sensor panel.

Figure 8A:
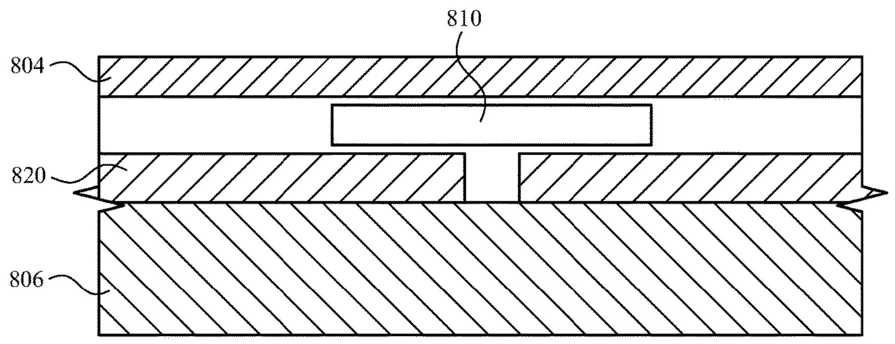
FIGS. 8A-8D illustrate exemplary touch sensor panel configurations which include one or more diffusing elements according to examples of the disclosure.
Figure 8B:
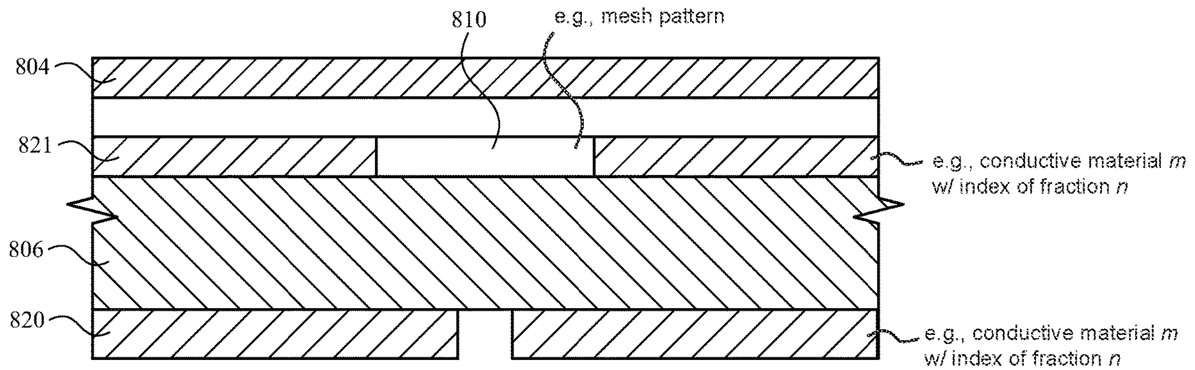
Figure 8C:
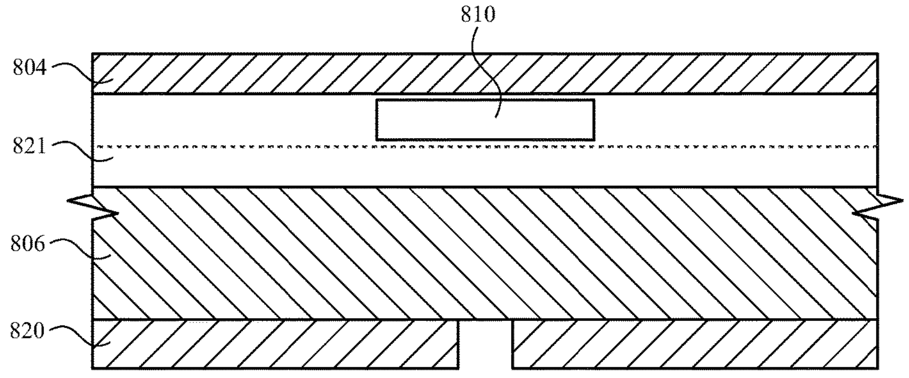
Figure 8D:
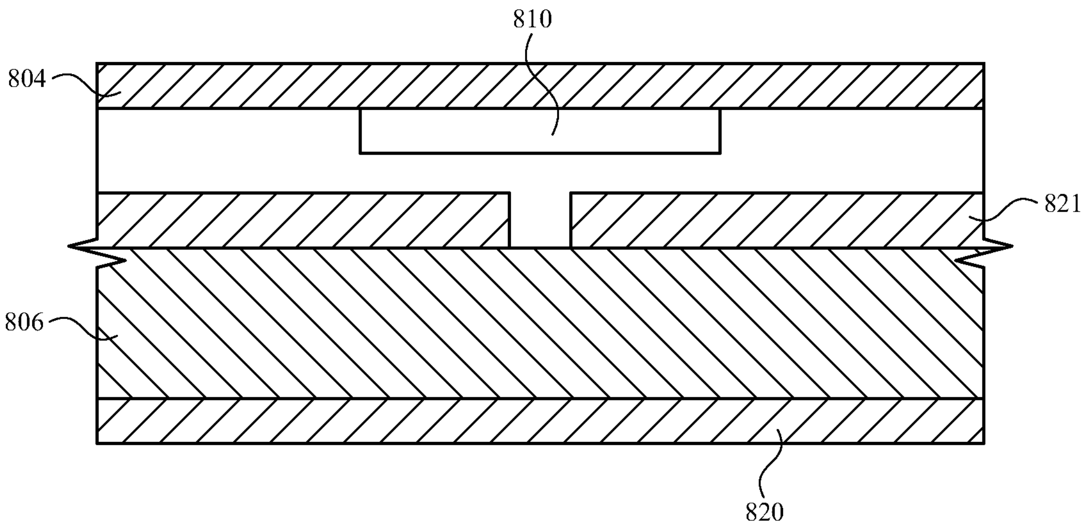

Diffusing elements can be implemented touch sensor screens in a variety of configurations. FIGS. 8A-8D illustrate examples of touch sensor panels 800 having at least one diffusing element according to examples of this disclosure. Each of the configurations in FIGS. 8A-8D includes at least a cover 804 (e.g., a touch screen cover glass), a diffusing element 810, a substrate 806, and a first electrode layer 820. For clarity, only one diffusing element is shown in each configuration of FIGS. 8A-8D, however, in some examples, a plurality of diffusing elements 810 can be patterned adjacent to one another. Further, in some cases, floating conductive segments can be patterned as dummy pixels, as explained in more detail below with reference to FIGS. 9A-9D. FIG. 8A shows a touch sensor panel, including a diffusing element 810. In this configuration, diffusing element 810 can be formed in a layer over electrodes 820. In some examples, this configuration can correspond to a self-capacitance system or a mutual-capacitance system wherein both drive and sense electrodes can be formed on a single layer. FIG. 8B shows a touch sensor panel including a diffusing element 810. In this configuration, diffusing element 810 can be formed on a substrate 806. Diffusing element 810 can be formed in a same layer as a second set of electrodes 821. In some examples, a first set of electrodes 820 can be formed on the opposite side of a double-sided ITO (DITO) substrate 806. This configuration can correspond, in some cases, to a mutual capacitance system where sense electrodes can be formed in the same first layer as diffusing element 810, drive electrodes can be formed in a second layer, and diffusing element 810 can diffuse capacitance to drive electrodes in the second layer. FIG. 8C shows a touch sensor panel, including a diffusing element 810. In this configuration, the diffusing element 810 can be formed on a layer (shown in dashed lines), which includes a second set of electrodes 821 (not visible), but diffusing element 810 is not formed directly over the second set of electrodes. The first set of electrodes 820 can be formed on a separate layer. In some examples, this configuration can correspond to a mutual capacitance system where the diffusing element can be formed above areas between the sense electrodes, drive electrodes 820 can be formed in a second layer, and the diffusing element 810 is configured to diffuse signal capacitance to drive electrodes 821. FIG. 8D illustrates a touch sensor panel including a diffusing element 810. This configuration can be similar to that shown in FIGS. 8A-8C, however, in this configuration the diffusing element 810 can be deposited onto the underside of cover 804 (e.g., a glass touch screen cover). It should be noted that the scope of this disclosure is not limited to the configurations shown here, but includes any touch sensor panel wherein diffusing elements 810 can be used to diffuse signal capacitance between electrodes according to examples of the disclosure. Moreover, for simplicity, other elements have been omitted in FIGS. 8A-8C that may be present in the touch sensor panel, including for example, additional conductive and dielectric layers.

Some examples of this disclosure relate to further using floating conductive segments to reduce the visibility of conductive material (e.g., ITO) patterns in a touch sensor panel. The details of these configurations will now be discussed below with reference to FIGS. 9-10.

Figure 9A:
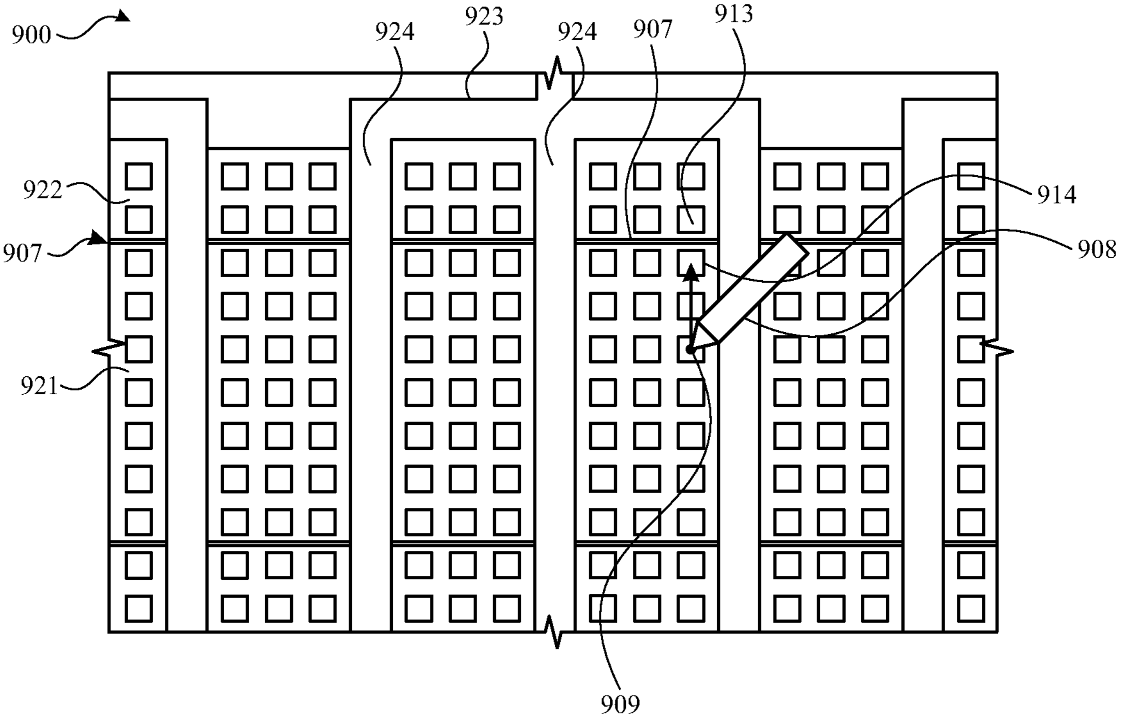
FIGS. 9A-9D illustrate an example touch sensor panel implementing diffusing elements and dummy pixels to improve optical uniformity according to examples of the disclosure.
Figure 9B:
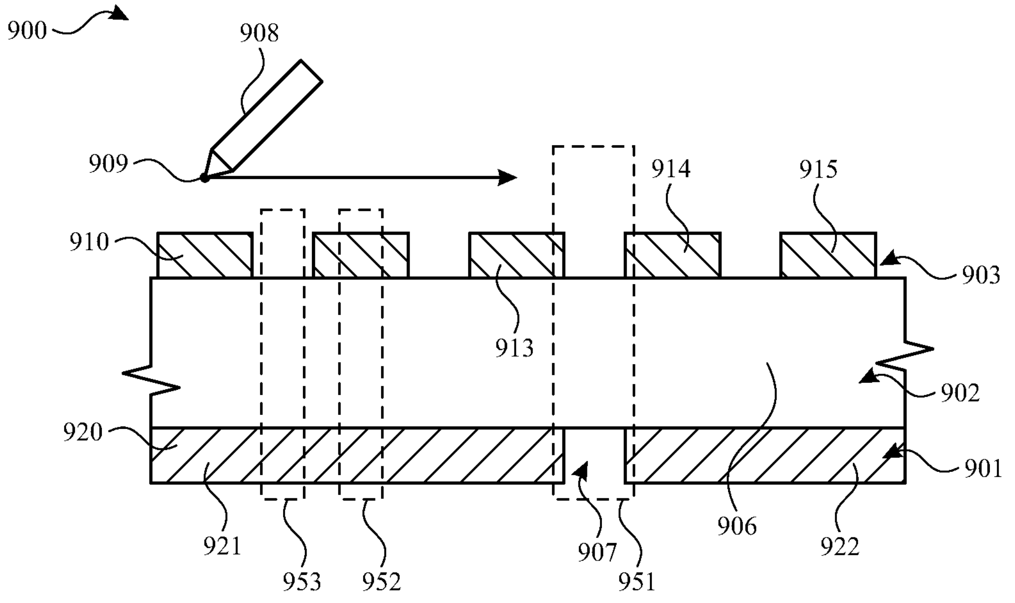

FIGS. 9A-9B illustrate an exemplary touch sensor panel 900 not having diffusing elements, but which can include floating conductive segments forming dummy pixels 910. As shown in FIG. 9B, the touch sensor panel 900 can comprise electrodes 920 formed in a first layer 901 by patterning a transparent or semi-transparent conductive material, such as an ITO material. In a second layer 902, a transparent or semi-transparent substrate 906 can be formed, for example, from plastic, glass, quartz, or a rigid or flexible composite. In a third layer 903, a group of second electrodes 923 (not visible in FIG. 9B) can be formed by patterning another semi-transparent conductive material such as an ITO material. Third layer 903 can also include a plurality of floating conductive segments forming dummy pixels 910. In the configuration shown in FIG. 9A, electrode 923 can include branches 924. For ease of correlation between FIG. 9A and FIG. 9B, a stylus 908 is shown at a position 909 along with a directional arrow. For purposes of discussion, areas of the touch sensor panel 951, 952, and 953 are shown in dashed boxes in FIGS. 9B and 9D. In this configuration, the floating conductive segments configured solely for optical purposes are referred to as dummy pixels as to distinguish them from floating conductive segments forming diffusing elements. However, as will be explained below, floating conductive segments forming diffusing elements can also be configured for optical purposes.

In some examples, electrodes in a touch sensor panel can be formed by depositing an ITO material over a substrate surface, and then etching away portions of the ITO layer in order to form electrode segments. As should be appreciated, within each layer, areas with ITO tend to have lower transparency than the areas without ITO. For example, in the configuration shown in FIG. 9B, the areas of first layer 901 where electrodes 921 and 922 are formed can have lower transparency than, for example, the area of gap 907 between the electrodes. Likewise, it should be appreciated that, when layers 901, 902, and 903 are stacked up, double-ITO areas with two layers of ITO (e.g., area 952) have less transparency than single-ITO areas with one layer of ITO (e.g., area 953), which have still less transparency than no-ITO areas with no ITO (e.g., area 951).

Because of the disparity in transparency, it can be beneficial to pattern the ITO in layers 901 and 903 as to reduce the visibility of the ITO patterns to the touch sensor panel user. In some examples, dummy pixels 910 can be formed on the third layer 903 such that single-ITO areas (e.g., area 953) can be formed in a grid pattern. For example, referring to FIG. 9A, areas where electrode 923 is formed over electrode 921 can be double-ITO areas, however, areas between the branches 924 of electrode 923 can be single-ITO areas (e.g., the ITO layer forming electrode 921). In order to make the touch sensor panel 900 more optically uniform, dummy pixels 910 having a width substantially the same as the branches 924 of electrode 923 can be formed in between the branches 924 of electrode 923. In some examples not shown, slits orthogonal to the branches of electrode 923 can be formed in layer 901 at areas under branches 924 of electrode 923. The slits can be spaced such that the area bordered by two slits and a branch 924 resembles a dummy pixel 910. This configuration can be conceptualized as a uniform single-ITO grid formed among double-ITO areas, wherein double-ITO areas correspond to areas where ITO is formed on both layer 901 and layer 903, and single-ITO areas correspond to areas where ITO is formed on only one of layer 901 or layer 903.

Figure 9C:
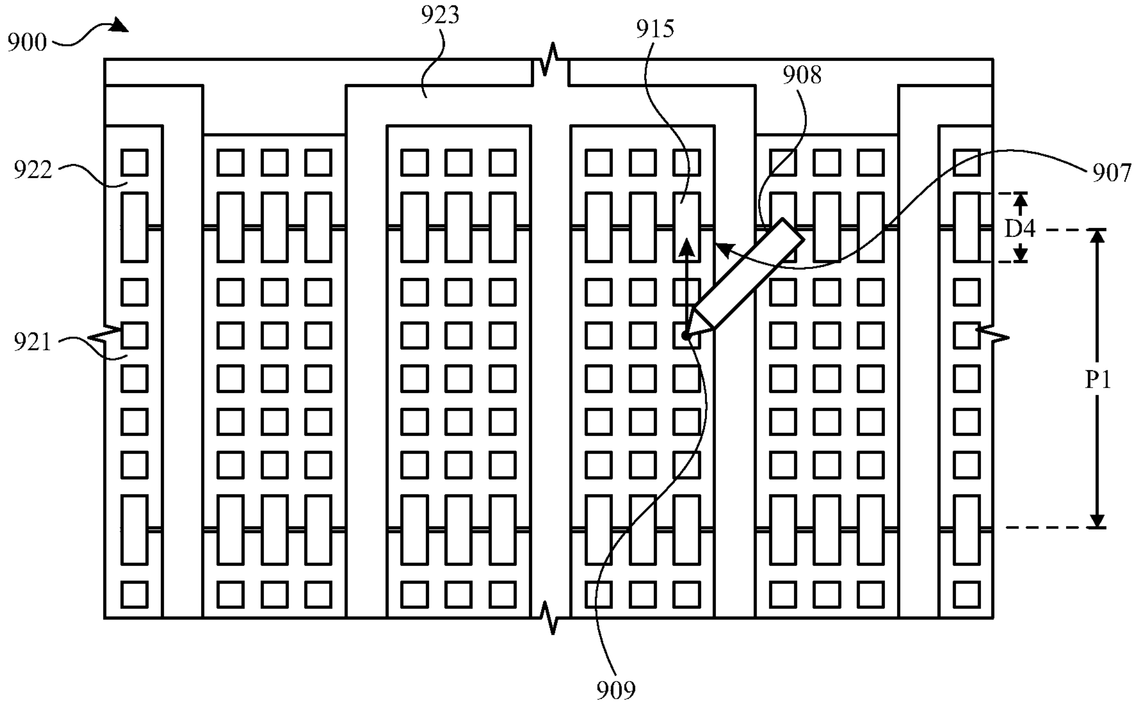
Figure 9D:
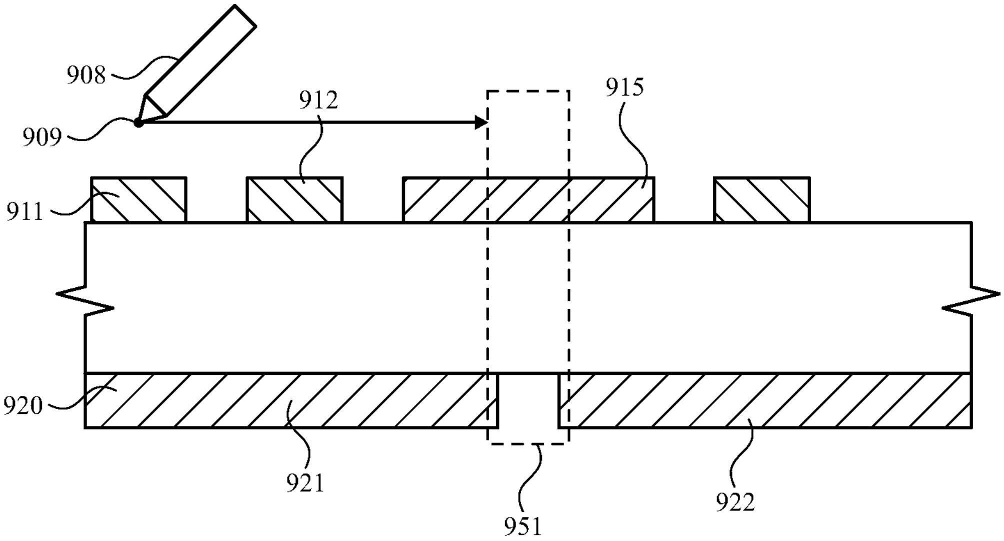

FIGS. 9C-9D illustrate an exemplary touch sensor panel 900 in a signal-diffusing configuration, which can include floating conductive segments forming both dummy pixels 911, 912, and 913 and a diffusing elements 915. Referring back to FIGS. 9A-9B, the single-ITO grid configuration can reduce the visibility of ITO patterns, however, portions of the touch sensor panel can still have no-ITO areas (e.g., area 951 including gap 907). Because no-ITO areas can be less transparent than the areas in the single-ITO grid, non-uniformities in the ITO pattern can still be visible to a touch sensor panel user. FIG. 9C illustrates a touch sensor panel configuration similar to the configuration discussed with reference to FIGS. 9A-9B above. However, unlike the configuration of FIGS. 9A-9B, the touch sensor panel shown in FIG. 9C can include a floating conductive segment forming a diffusing element 915, which can have portions over both electrodes 921 and 922. In this example, diffusing element 915 can diffuse signal capacitance between electrodes 921 and 922, as set forth in preceding examples.

As discussed in detail above, using diffusing elements to diffuse signal capacitance among electrodes can be beneficial to reduce wobble error in a touch sensor panel. However, as shown in FIGS. 9C-9D, diffusing elements can also be configured to improve the optical uniformity of the touch sensor panel. By bridging gap 907 with diffusing element 915, substantially all of the touch sensor panel can comprise either double-ITO areas or single-ITO areas. Further, in some examples, diffusing element 915 can be configured such that the single-ITO and double-ITO areas formed by diffusing element 915 can appear consistent with a single-ITO grid configuration, as described with reference to FIG. 9A above. In some configurations, diffusing element 915 can have a shape resembling multiple “merged” dummy pixels. For example, diffusing element 915 shown in FIG. 9C has a width substantially equal to one dummy pixel and a length substantially equal to the distance D4 between an edge of a first dummy pixel and an opposing edge of an adjacent dummy pixel. Thus, diffusing element 915 can resemble the shape of two merged dummy pixels. It is to be understood that in other examples, diffusing elements 915 can resemble the shape of any plurality of merged dummy pixels. Moreover, as explained with reference to FIGS. 7A-7D, diffusing element 915 can diffuse signal capacitance in multiple dimensions, need not be uniform, and need not be rectangular. In some examples, the dimensions of diffusing element 915 can be selected in accordance with the information set forth above with regards to FIG. 5. For example, referring back to the discussion relating of FIG. 5, in examples where diffusing elements 915 are configured to resemble merged dummy pixels, the width W1 of diffusing elements 915 can be selected as to be the nearest values to an optimal ratio W1:P1, while still maintaining properties of optical uniformity. The index of refraction of both ITO layers 903 and 901 can be substantially the same as to reduce ITO pattern visibility. In some examples, the ITO layer forming floating conductive segments (e.g., dummy pixels 911-913 and diffusing elements 915) can be of the same material as the ITO layer that forms electrodes 920 in order to provide the best optical index matching to the ITO. In other examples, index matching materials may be applied to the ITO layer forming floating conductive segments to better match the optical index of the ITO layer forming electrodes.

Although the configurations of FIGS. 9A-9D have been described in terms of floating conductive segments being formed on the same layer as electrodes, in other examples, the floating conductive segments, including dummy pixels and diffusing elements, can be formed in a layer different than the electrode layer, as discussed above with reference to FIGS. 9A-9D. In some configurations where floating conductive segments are formed in a third layer of ITO (e.g., the configurations shown in FIGS. 9C and 9D), some portions of the touch sensor panel may have triple-ITO areas, double-ITO areas, single-ITO areas, and/or no-ITO areas. In these configurations, floating conductive segments can operate similar to the configurations discussed in FIGS. 9A-9D. For example, diffusing elements can be configured to create areas of double-ITO as to match a double-ITO grid among a triple-ITO area.

Figure 10A:
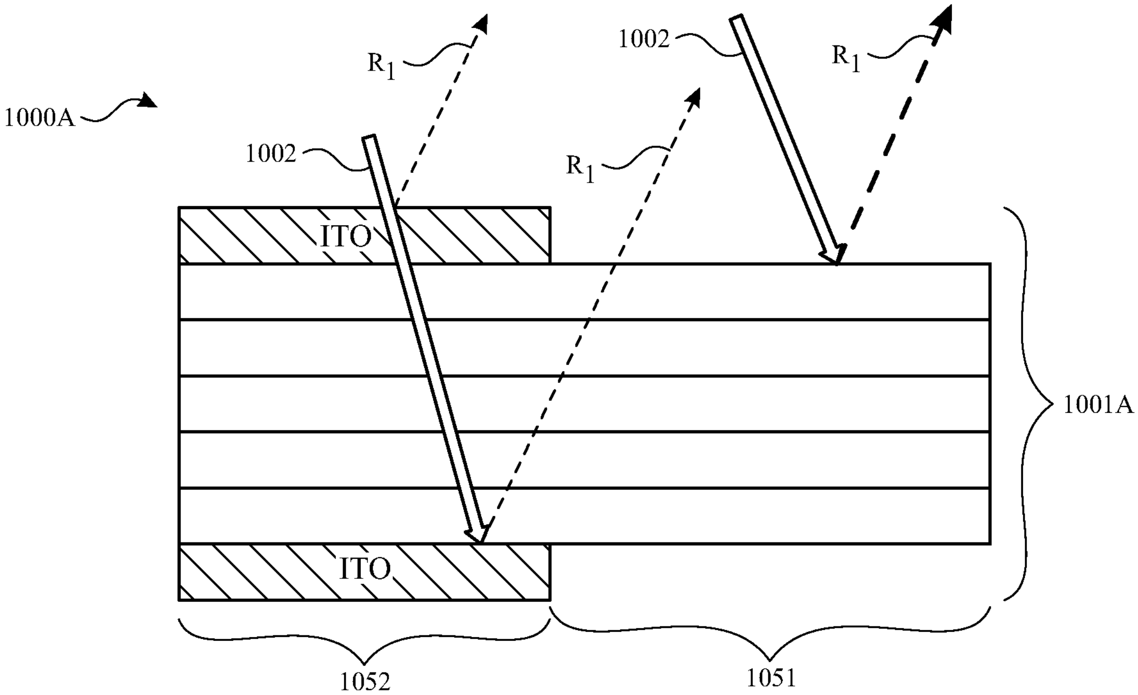
FIGS. 10A-10C illustrate an improvement in reflectance in an exemplary touch sensor panel, which includes a diffusing element to improve optical uniformity according to examples of the disclosure.
Figure 10B:
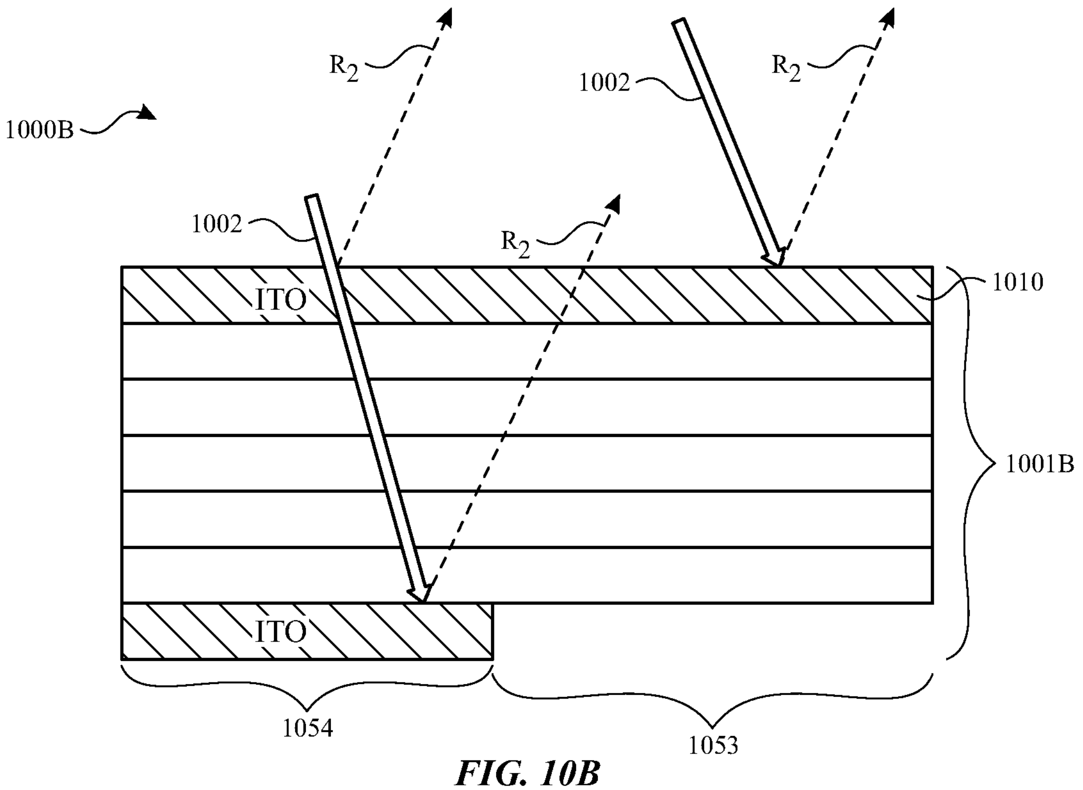
Figure 10C:
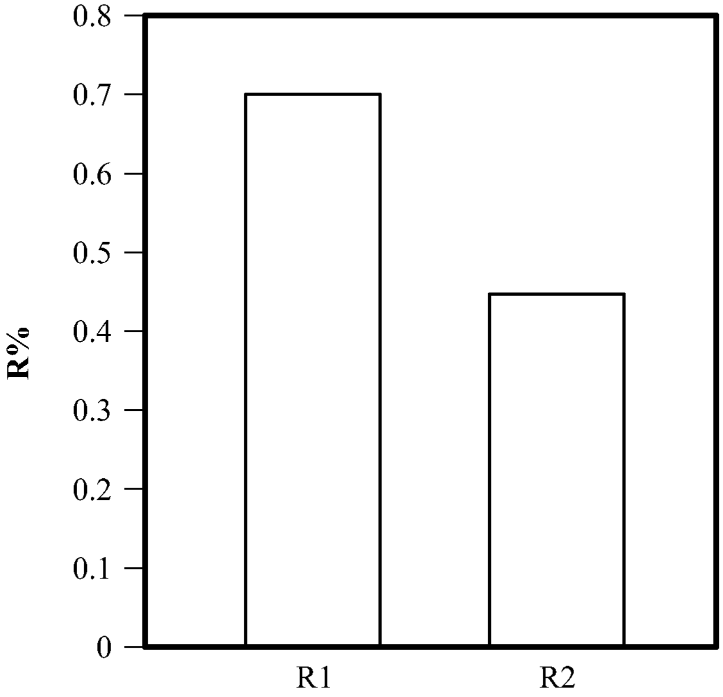

FIGS. 10A-10C illustrate the improvement in light reflectance in an exemplary touch sensor panel, which includes a diffusing element to improve optical uniformity according to examples of this disclosure. Light reflectance is represented conceptually as arrows having different line weights, the heaviest line weight corresponding to the strongest light. FIG. 10A illustrates a touch sensor panel 1000*a* having a layer stackup 1001*a*, including a double-ITO area 1052 and a no-ITO area 1051. As light enters the layer stackup 1001*a*, a percentage of light 1002 is reflected back from the stackup. As shown in FIG. 10A, light reflected in the double-ITO area 1052 is less than that in the no-ITO area 1051. The light reflected back from the stackup is collectively represented by a reflectance R1. In some cases, this reflectance R1 can evidence itself as visibility in the ITO pattern of the touch sensor panel to a touch sensor panel user. FIG. 10B illustrates a touch sensor panel 1000*b* having a layer stackup 1001*b* including a double-ITO area 1054 and a single-ITO area 1053, wherein the single-ITO area is formed by a diffusing element 1010. As shown in FIG. 10B, when a touch sensor panel includes diffusing element 1010, less light can be reflected back from the stackup 1001*b*. Specifically, as in FIG. 10A, less light can be reflected off the double-ITO area 1054, and less light can be reflected off the single-ITO area 1053. The light reflected back from the stackup in this configuration is collectively represented by reflectance R2. As indicated by FIGS. 10A-10B, the reflectance R2 of a touch sensor panel including diffusing element 1010 can be less than the reflectance R1 of a touch sensor panel without the diffusing element. FIG. 10C illustrates a chart showing a quantitative comparison of reflectances R1 and R2. As shown, a touch sensor panel including one or more diffusing elements can reduce reflectance by approximately 40% in areas where the diffusing element bridges an area of no-ITO.

Figure 11A:
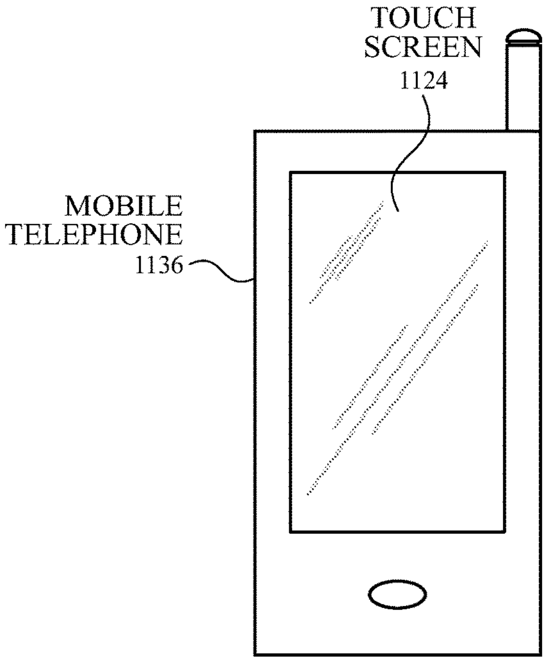
FIGS. 11A-11D illustrate example systems in which diffusing elements can be implemented according to examples of the disclosure.
Figure 11B:
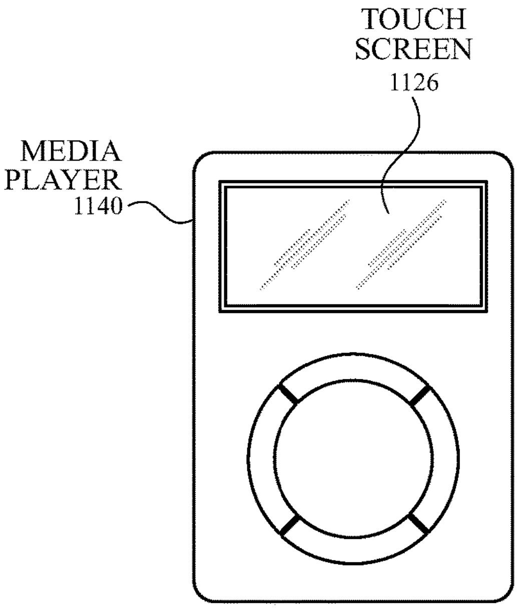
Figure 11C:
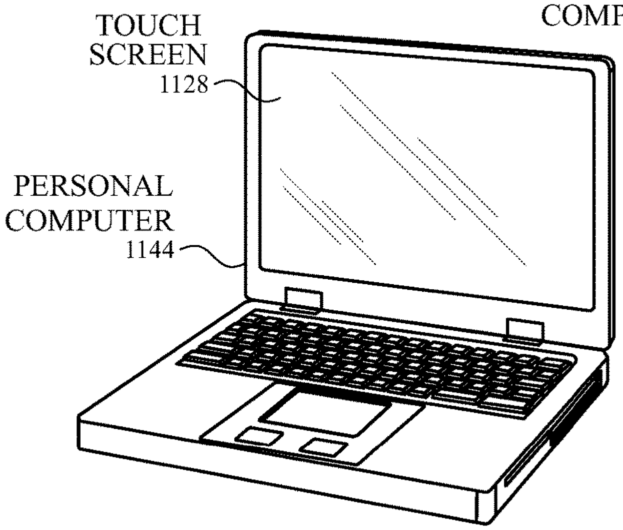
Figure 11D:
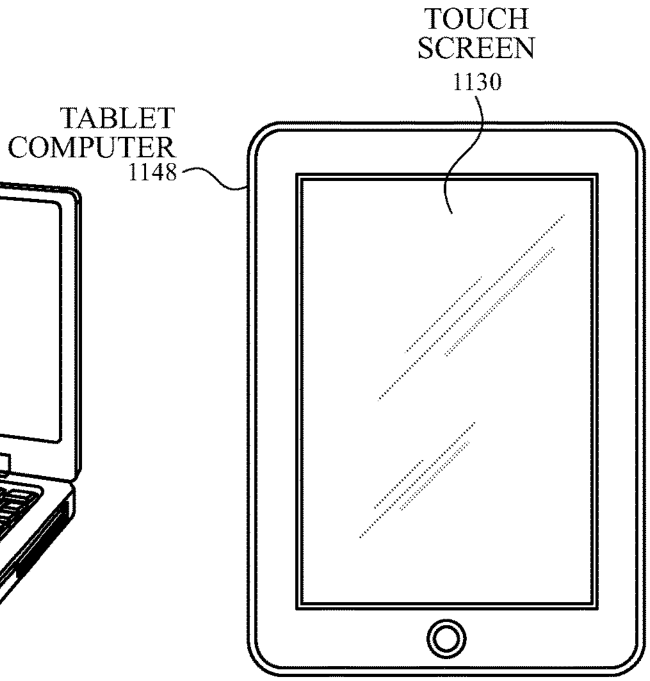

FIGS. 11A-11D illustrate example systems in which diffusing elements can be implemented according to examples of the disclosure. FIG. 11A illustrates an example mobile telephone 1136 that includes a touch screen 1124 that can include diffusing elements according to various examples. FIG. 11B illustrates an example digital media player 1140 that includes a touch screen 1126 that can include diffusing elements according to various examples. FIG. 11C illustrates an example personal computer 1144 that includes a touch screen 1128 that can include diffusing elements according to various examples. FIG. 11D illustrates an example tablet computing device 1148 that includes a touch screen 1130 that can include diffusing elements according to various examples. The touch screen and computing system blocks that can implement diffusing elements for reducing stylus tip wobble can be implemented in other devices including in wearable devices.

Thus, the examples of the disclosure provide various configurations to diffuse signal capacitance using diffusing elements, thereby making the signal profile for the sense electrode more linear, thus reducing stylus tip wobble and increasing touch sensor panel performance.

Some examples of the disclosure are directed to a touch sensor panel comprising: a first layer of a first conductive material including a plurality of electrically isolated electrodes, including a first electrode and a second electrode; a second layer of a second conductive material including a first floating conductor, the first floating conductor including: a first portion of the first floating conductor formed over a portion of the first electrode; and a second portion of the first floating conductor formed over a portion of the second electrode. Additionally or alternatively to one or more of the examples disclosed above, in some examples, the first electrode is configured to be capacitively coupled to the first floating conductor; and the second electrode is configured to be capacitively coupled to the first floating conductor. Additionally or alternatively to one or more of the examples disclosed above, in some examples, the first conductive material comprises a transparent or semi-transparent conductive material; the second conductive material comprises a transparent or semi-transparent conductive material; and an index of refraction of the second conductive material is substantially the same as an index of refraction of the first conductive material. Additionally or alternatively to one or more of the examples disclosed above, in some examples, the second layer of second conductive material is disposed on a glass substrate of the touch sensor panel. Additionally or alternatively to one or more of the examples disclosed above, in some examples, the second conductive material is the same as the first conductive material. Additionally or alternatively to one or more of the examples disclosed above, in some examples, the first floating conductor comprises a mesh pattern of the second conductive material. Additionally or alternatively to one or more of the examples disclosed above, in some examples, the second layer of second conductive material further includes a second plurality of electrically isolated electrodes. Additionally or alternatively to one or more of the examples disclosed above, in some examples, the second layer of the second conductive material further includes a plurality of floating conductors, the plurality of floating conductors including the first floating conductor; and the plurality of floating conductors further includes a set of floating dummy pixels disposed on the second layer of the second conductive material in one or more repeating patterns. Additionally or alternatively to one or more of the examples disclosed above, in some examples, the second layer of second conductive material further includes a second plurality of electrically isolated electrodes; and each of the plurality of floating conductors has substantially a same width. Additionally or alternatively to one or more of the examples disclosed above, in some examples, the width of each of the plurality of floating conductors is substantially the same as a width of each of a plurality of branches of the second plurality of electrically isolated electrodes. Additionally or alternatively to one or more of the examples disclosed above, in some examples, the first floating conductor has a length substantially equal to a combined length of a number of floating dummy pixels and the spaces between the number of floating dummy pixels. Additionally or alternatively to one or more of the examples disclosed above, in some examples, the number of floating dummy pixels having the combined length is greater than three. Additionally or alternatively to one or more of the examples disclosed above, in some examples, the first electrode and the second electrode have a pitch; the first floating conductor has a length; and a ratio between the pitch and the length of the first floating conductor is greater than 3. Additionally or alternatively to one or more of the examples disclosed above, in some examples, the ratio between the pitch and the length of the first floating conductor is less than 5. Additionally or alternatively to one or more of the examples disclosed above, in some examples, the touch sensor panel further comprises a third electrode of the plurality of electrically isolated electrodes, wherein the first floating conductor further includes a third portion of the first floating conductor formed over a portion of the third electrode. Additionally or alternatively to one or more of the examples disclosed above, in some examples, the second electrode is proximate to the first electrode in a first direction; and the third electrode is proximate to the first electrode in a second direction orthogonal to the first direction.

Some examples of the disclosure are directed to a method for detecting an object proximate to a touch sensor panel, comprising: capacitively coupling the object to a first electrode and a second electrode through a first segment of conductive material electrically isolated from the first electrode and the second electrode; detecting a first portion of a signal indicative of a proximity of the object on the first electrode; and detecting a second portion of the signal on the second electrode. Additionally or alternatively to one or more of the examples disclosed above, in some examples, the method further comprises disposing the first segment of conductive material between the object and the first and second electrodes. Additionally or alternatively to one or more of the examples disclosed above, in some examples, the method further comprises capacitively coupling the object to the first and second electrodes through the first segment of conductive material by locating the first segment of conductive material over at least a portion of both the first and second electrodes. Additionally or alternatively to one or more of the examples disclosed above, in some examples, the method further comprises capacitively coupling the object to a third electrode; disposing the first and second electrodes between the third electrode and the first segment of conductive material; and detecting a third portion of the signal on the third electrode. Additionally or alternatively to one or more of the examples disclosed above, in some examples, the method further comprises disposing the first segment of conductive material adjacent to the third electrode. Additionally or alternatively to one or more of the examples disclosed above, in some examples, the method further comprises capacitively coupling the object to a third electrode through the segment of conductive material; and detecting a third portion of the signal on the third electrode. Additionally or alternatively to one or more of the examples disclosed above, in some examples, the second electrode is adjacent to the first electrode in a first direction and the third electrode is adjacent to the first electrode in a second direction orthogonal to the first direction.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method of detecting an object above a first gap between first and second electrodes formed from a first conductive material in a first layer in a touch sensor panel, the first gap separating the first and second electrodes, free of the first conductive material, and defining a first area between the first and second electrodes, and wherein the first and second electrodes are configured for self-capacitance sensing, the method comprising:

diffusing signal capacitance to the first and second electrodes by capacitively coupling a diffusing element with the object and the first and second electrodes, the diffusing element formed from a second conductive material on a second layer formed over the first layer, and formed entirely above the first area between the first and second electrodes, wherein a first portion of the diffusing element overlaps the first electrode and is formed over less than a full first width of the first electrode, wherein a second portion of the diffusing element overlaps the second electrode and is formed over less than a full second width of the second electrode, wherein a third portion of the diffusing element overlaps the first gap, and wherein a width of the first portion, a width of the second portion, and a width of the third portion are uniform; and detecting the object based on the capacitive coupling between the object, the diffusing element and the first and second electrodes.

2. The method of claim 1, the touch sensor panel further including third and fourth electrodes separated by a second gap and formed on a third layer, the method further comprising:

diffusing signal capacitance to the third and fourth electrodes by capacitively coupling the diffusing element with the object, and with one or more of the first, second, third and fourth electrodes; and detecting the object based on the capacitive coupling between the object, the diffusing element, and one or more of the first, second, third and fourth electrodes.

3. The method of claim 2, wherein the first and second electrodes are sense electrodes and the third and fourth electrodes are drive electrodes.

4. The method of claim 1, wherein the diffusing element further comprises a plurality of floating conductive elements adjacent to one another.

5. The method of claim 1, wherein the first conductive material comprises a first transparent or semi-transparent conductive material, and the second conductive material comprises a second transparent or semi-transparent conductive material, the method comprising:

matching an index of refraction of the second conductive material to an index of refraction of the first conductive material.

6. The method of claim 1, further comprising driving one of the first and second electrodes with a stimulation signal and sensing a change in capacitance on the other of the first and second electrodes for mutual capacitance sensing.

7. A touch sensor panel comprising:

a first plurality of touch electrodes formed in a first layer of first conductive material, the first plurality of touch electrodes including first and second touch electrodes having a first gap therebetween that is free of the first conductive material, and wherein the first and second touch electrodes are configured for self-capacitance sensing;

a first floating conductive element formed entirely above the first gap in a second layer of second conductive material, the first floating conductive element configured to capacitively couple with the first and second touch electrodes and an object located at least partially above the first gap, wherein a first portion of the first floating conductive element overlaps the first touch electrode and is formed over less than a full first width of the first touch electrode, wherein a second portion of the first floating conductive element overlaps the second touch electrode and is formed over less than a full second width of the second touch electrode, wherein a third portion of the first floating conductive element overlaps the first gap, and wherein a width of the first portion, a width of the second portion, and a width of the third portion are uniform; and a panel subsystem communicatively coupled to the first and second touch electrodes and configured to detect a change in capacitance on at least one of the first and second touch electrodes due to the capacitive coupling between the object, the first floating conductive element, and the first and second touch electrodes.

8. The touch sensor panel of claim 7, further comprising:

a second plurality of touch electrodes formed in a third layer of third conductive material, the second plurality of touch electrodes including third and fourth touch electrodes;

wherein the first floating conductive element is further configured to capacitively couple with the third and fourth touch electrodes; and wherein the panel subsystem is communicatively coupled to the third and fourth touch electrodes and configured to detect a change in capacitance on at least one of the first, second, third and fourth touch electrodes due to the capacitive coupling between the object, the first floating conductive element, and the first, second, third and fourth touch electrodes.

9. The touch sensor panel of claim 8, wherein the first and second touch electrodes are configured as sense electrodes and the third and fourth touch electrodes are configured as drive electrodes.

10. The touch sensor panel of claim 7, wherein the first and second touch electrodes are configured as drive and sense electrodes for mutual capacitance sensing.

11. A touch sensor panel comprising:

a first layer of first conductive material including a first electrode, a second electrode, and a first gap, the first gap separating the first and second electrodes and free of the first conductive material, wherein the first and second electrodes are configured for self-capacitance sensing; and a second layer of second conductive material including a first floating conductive element, the second layer formed over the first layer;

wherein the first gap defines a first area between the first and second electrodes;

wherein the first floating conductive element is formed above the first area between the first and second electrodes, and entirely above the first gap, and is configured to diffuse signal capacitance with the first and second electrodes for touch sensing;

wherein a first portion of the first floating conductive element overlaps the first electrode and is formed over less than a full first width of the first electrode;

wherein a second portion of the first floating conductive element overlaps the second electrode and is formed over less than a full second width of the second electrode;

wherein a third portion of the first floating conductive element overlaps the first gap; and wherein a width of the first portion, a width of the second portion, and a width of the third portion are uniform.

12. The touch sensor panel of claim 11, further comprising:

a third layer of third conductive material including a third electrode, a fourth electrode, and a second gap, the second gap separating the third and fourth electrodes and free of the third conductive material;

wherein the first floating conductive element is configured to diffuse signal capacitance with the third and fourth electrodes; and wherein the third and fourth electrodes are configured to be capacitively coupled with the first and second electrodes, respectively, to generate touch signals for mutual capacitance touch sensing.

13. The touch sensor panel of claim 12, wherein the first and second electrodes are configured as sense electrodes and the third and fourth electrodes are configured as drive electrodes.

14. The touch sensor panel of claim 11, wherein the first floating conductive element further comprises a plurality of electrically isolated diffusing elements adjacent to one another.

15. The touch sensor panel of claim 11, wherein:

the first conductive material comprises a first transparent or semi-transparent conductive material;

the second conductive material comprises a second transparent or semi-transparent conductive material; and an index of refraction of the second conductive material is the same as an index of refraction of the first conductive material.

16. The touch sensor panel of claim 12, wherein the first layer of the first conductive material and the third layer of the third conductive material are disposed on opposing sides of a single substrate.

17. The touch sensor panel of claim 11, wherein the first and second electrodes are configured as drive and sense electrodes for mutual capacitance sensing.

* * * * *